(12) United States Patent
Ying

(10) Patent No.: US 10,046,863 B2
(45) Date of Patent: *Aug. 14, 2018

(54) HELICOPTER LANDING PAD

(71) Applicant: I/O Controls Corporation, Azusa, CA (US)

(72) Inventor: Jeffrey Ying, Glendora, CA (US)

(73) Assignee: I/O Controls Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,122

(22) Filed: Oct. 12, 2015

(65) Prior Publication Data

US 2016/0176543 A1    Jun. 23, 2016

Related U.S. Application Data

(60) Continuation of application No. 14/087,849, filed on Nov. 22, 2013, now Pat. No. 9,296,492, which is a
(Continued)

(51) Int. Cl.
*B64F 1/36* (2017.01)
*B64F 1/00* (2006.01)
(Continued)

(52) U.S. Cl.
CPC .............. *B64F 1/007* (2013.01); *B64F 1/005* (2013.01); *B64F 1/18* (2013.01); *B64F 1/222* (2013.01)

(58) Field of Classification Search
CPC ...... B64F 1/05; B64F 1/00; B64F 1/36; B64F 1/007; B64F 1/02; B64F 1/18;
(Continued)

(56) References Cited

U.S. PATENT DOCUMENTS 2,292,078 A * 8/1942 Inman .................... E04B 1/342
                                                    135/116
3,034,607 A * 5/1962 Haines, Jr. ............... E04H 6/44
                                                       52/64
(Continued)

FOREIGN PATENT DOCUMENTS

WO    2009/089449    7/2009

*Primary Examiner* — Medhat Badawi
(74) *Attorney, Agent, or Firm* — Irell & Manella, LLP

(57) ABSTRACT

A mobile helicopter landing pad comprises a platform with one or more elongate, concave guiding channels for aligning a helicopter on the landing pad by forcing the helicopter's skates into a specific alignment upon landing. The guiding channels may have laterally disposed rollers or else be made of slick material to allow the helicopter to slide towards the base of the guiding channel under the helicopter's own weight. Additional crosswise rollers at the bottom of the guiding channel(s) may be provided to allow the helicopter to be moved forward or backward after landing. A blade locking arm swings upward and secures the top rotor. The pad may include a foldable enclosure that protects the helicopter after landing, and an electronic guidance system that assists the pilot during landing by providing instructions to the pilot or visual indications of the prevailing wind direction and velocity, through illuminated signals on the platform.

16 Claims, 20 Drawing Sheets

Related U.S. Application Data division of application No. 13/626,774, filed on Sep. 25, 2012, now Pat. No. 8,616,497, which is a division of application No. 12/691,558, filed on Jan. 21, 2010, now Pat. No. 8,297,552.

(51) Int. Cl.
*B64F 1/18* (2006.01)
*B64F 1/22* (2006.01)

(58) Field of Classification Search
CPC .... B64F 1/222; B64C 1/22; E01F 3/00; E04B 1/344; E04H 6/00; E04H 6/44
See application file for complete search history.

(56) References Cited

U.S. PATENT DOCUMENTS

| | | | | |
|---|---|---|---|---|
| 3,229,649 A | * | 1/1966 | Baker | E04H 9/10 109/1 R |
| 3,353,310 A | * | 11/1967 | Ruhle | E04H 6/44 52/66 |
| 3,353,311 A | * | 11/1967 | McClure | B60P 3/34 52/122.1 |
| 3,712,363 A | * | 1/1973 | Thomassen | E04H 6/44 160/113 |
| 3,785,316 A | * | 1/1974 | Leming | B64F 1/24 114/261 |
| 3,817,479 A | * | 6/1974 | Crowley | B60V 1/00 180/116 |
| 3,818,652 A | * | 6/1974 | Pierce | E04H 6/44 244/114 R |
| 3,823,519 A | * | 7/1974 | Cordova | E04H 6/44 244/114 R |
| 3,893,538 A | * | 7/1975 | Thompson | B60V 3/025 104/23.2 |
| 4,116,408 A | * | 9/1978 | Soloy | B64F 1/007 244/110 E |
| 4,255,911 A | * | 3/1981 | Beacom | E04B 1/3442 52/174 |
| 4,665,857 A | * | 5/1987 | Akerman | B63B 35/50 114/261 |
| 4,669,683 A | * | 6/1987 | Guillory | E01F 3/00 114/258 |
| 4,834,321 A | * | 5/1989 | Granger | B64F 1/007 244/110 E |
| 4,883,241 A | * | 11/1989 | Snead | B64F 1/007 105/238.1 |
| 5,067,669 A | * | 11/1991 | Van Horn | B64F 1/007 244/114 R |
| 5,119,935 A | * | 6/1992 | Stump | B64F 1/22 206/335 |
| 5,351,915 A | * | 10/1994 | Aandalen | E01F 3/00 244/114 R |
| 5,367,973 A | * | 11/1994 | Heggertveit | B63B 35/52 114/261 |
| 5,577,687 A | * | 11/1996 | Downing | B64F 1/007 244/110 E |
| 5,950,372 A | * | 9/1999 | Al-Sabah | F41F 3/04 52/66 |
| 6,079,668 A | * | 6/2000 | Brown | B64F 1/007 244/110 E |
| 6,203,263 B1 | * | 3/2001 | Hancock | B64F 1/22 180/904 |
| 6,758,230 B2 | * | 7/2004 | Bogart, Jr. | E04H 6/44 135/124 |
| 8,297,552 B2 | * | 10/2012 | Ying | B64F 1/005 244/110 E |
| 8,336,807 B2 | | 12/2012 | Hanafin et al. | |
| 8,616,497 B2 | * | 12/2013 | Ying | B64F 1/005 244/110 E |
| 9,033,390 B1 | * | 5/2015 | Ksiezopolski | B60R 13/06 296/26.13 |
| 9,296,492 B2 | * | 3/2016 | Ying | B64F 1/005 |
| 9,359,783 B1 | * | 6/2016 | Josdal | E04H 15/18 |
| 9,457,916 B2 | * | 10/2016 | McDermott | B64F 1/18 |
| 9,555,898 B2 | * | 1/2017 | Garner | B64F 1/007 |
| 2004/0256519 A1 | * | 12/2004 | Ellis | B64C 39/024 244/110 E |
| 2005/0230537 A1 | * | 10/2005 | Chouery | B63B 17/00 244/116 |
| 2008/0268404 A1 | * | 10/2008 | Burt | G09B 19/12 434/55 |
| 2009/0057486 A1 | * | 3/2009 | Becht, IV | B64F 1/007 244/114 R |
| 2010/0200694 A1 | * | 8/2010 | Tripier-Larivaud | B63B 35/52 244/114 R |
| 2010/0320313 A1 | * | 12/2010 | Hanafin | B64F 1/005 244/17.17 |
| 2013/0134260 A1 | * | 5/2013 | Besenzoni | B63B 3/48 244/110 E |
| 2013/0202446 A1 | * | 8/2013 | Siegfriedsen | E01F 3/00 416/244 A |
| 2016/0176543 A1 | * | 6/2016 | Ying | B64F 1/005 244/114 R |
| 2017/0226705 A1 | * | 8/2017 | Dotlich | E01C 11/225 |

* cited by examiner

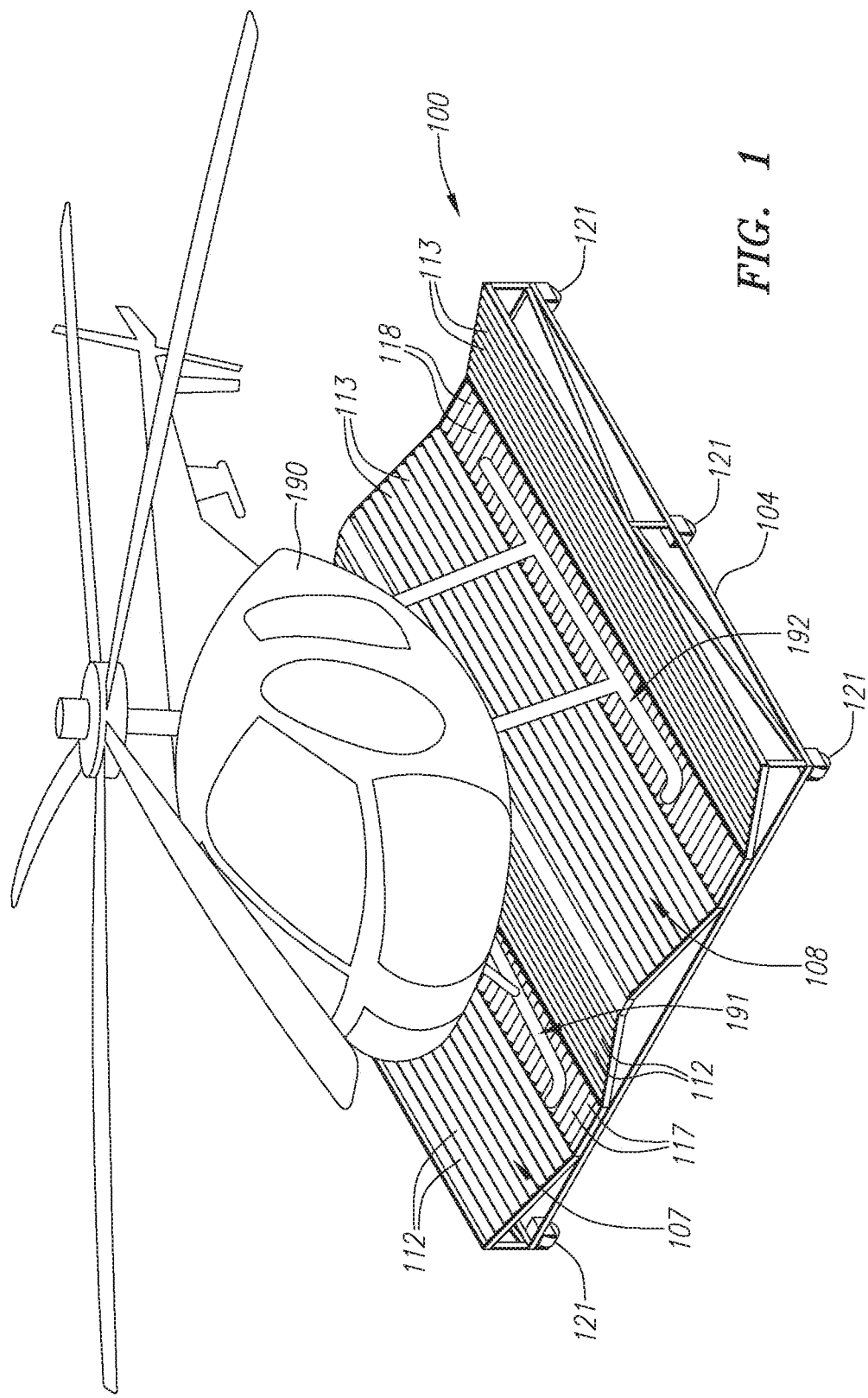

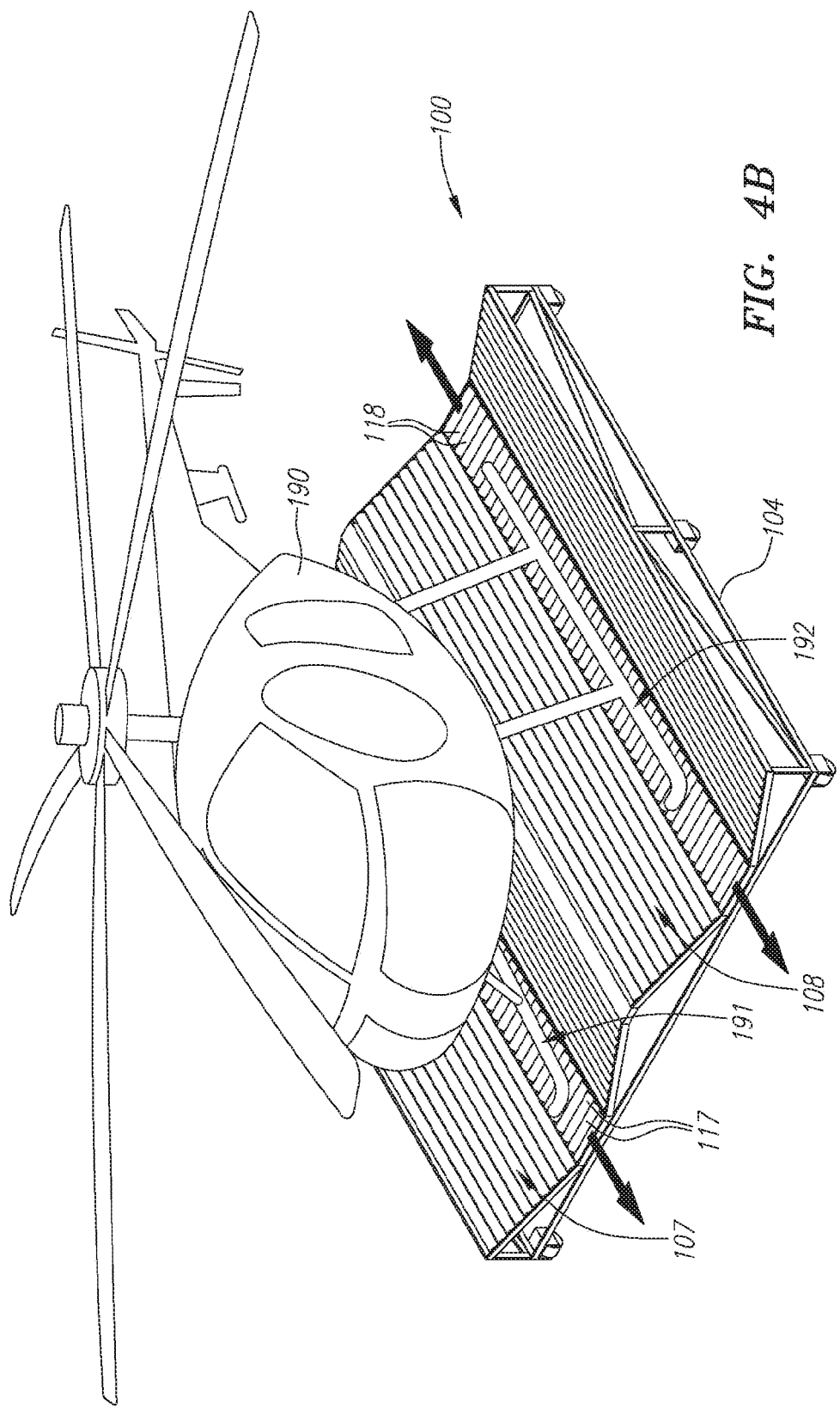

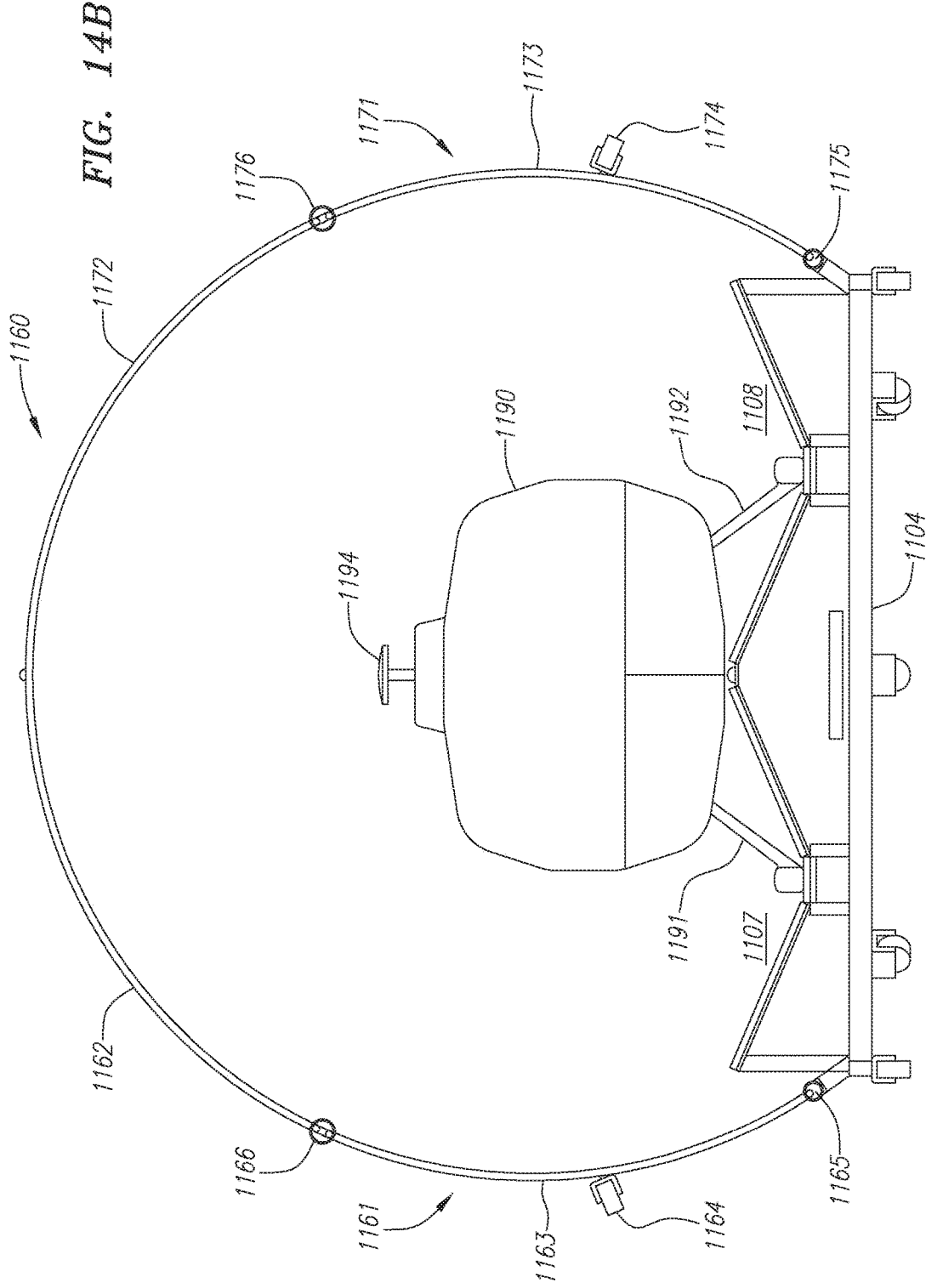

HELICOPTER LANDING PAD

CROSS-REFERENCE TO RELATED APPLICATION

This is a continuation application which claims priority to U.S. patent application Ser. No. 14/087,849 filed Nov. 22, 2013, pending, which claims priority to U.S. patent application Ser. No. 13/626,774 filed Sep. 25, 2012, now U.S. Pat. No. 8,616,497 issued Dec. 31, 2013, which claims priority to U.S. patent application Ser. No. 12/691,558 filed Jan. 21, 2010, now U.S. Pat. No. 8,297,552 issued Oct. 30, 2012.

BACKGROUND OF THE INVENTION

1) Field of the Invention

The field of the present invention relates to helicopter landing pads.

2) Background

Helicopters find service in many different areas, from commercial to military to recreational. A longstanding difficulty with helicopter flight has been landing the craft, particularly in windy or inclement conditions. It can also be inconvenient to stow and store a helicopter between uses.

Helicopters are often landed on special landing pads, referred to as "helipads." Such helipads are often provided on top of tall buildings in urban settings, and are generally constructed as a large flat platform. Helipads are also provided at airports, or on relatively large water vessels, such as commercial fishing boats, freighters, coast guards, or military vessels.

To land safely on a helipad, it is critical that the pilot know the direction and velocity of the wind in the area around the helipad. Although weather reports may provide general information about prevailing wind conditions, conventionally pilots rely on a windsock or vane in the vicinity of the helipad that gives an indication of the wind direction and some useful information about velocity. To view the windsock or vane, the pilot must first approach the helipad and maneuver in a position where it is visible, and then orient the helicopter according to the prevailing wind conditions. Generally, the helicopter is landed by flying towards the wind, because otherwise the horizontal crosswinds make it harder to control the helicopter and pose a danger when landing. However, if the wind changes direction when landing, the pilot may not immediately notice the change in the windsock or vane, increasing the risk in landing the craft.

Once the helicopter has landed, it can also be inconvenient to stow and store the craft. Many helicopters do not have wheels and can thus be difficult to transport after landing. Removable wheels can be manually placed beneath the helicopter struts to allow the helicopter to be towed after landing. However, this takes time and labor, and is inconvenient.

Typically when stowed, the helicopter is towed to a hangar for storage, but often a hangar can be too small for the helicopter because of the span of the helicopter blades, particularly at smaller airports which generally handle small aircraft. The helicopter can be stored outside a hangar, but then it is exposed to the elements, and high winds can potentially topple the craft, causing serious damage. These problems are magnified when landing a helicopter on a waterborne vessel. It is often necessary to lock down the helicopter after landing on such a vessel, but it is difficult to orient the helicopter at the desired angle on a ship's helipad, thus making it difficult to prefabricate fixed equipment for securing the helicopter after landing. To ensure that the helicopter is oriented in a forward direction, the ship must be steered into the wind, allowing the helicopter to fly into the wind when landing. This complicates helicopter landing and requires special coordinated action between the helicopter pilot and the ship's pilot.

It would therefore be advantageous to provide a helicopter landing pad that overcomes one or more of the foregoing drawbacks, disadvantages, or limitations. It would further be advantageous to provide a helicopter landing pad which is more convenient for landing and improves safety. It would also be advantageous to provide such a landing pad which increases convenience for stowing and storing the helicopter after landing.

SUMMARY OF THE INVENTION

The invention is generally directed in one aspect to a novel and versatile helicopter landing pad. According to one embodiment as disclosed herein, a helicopter landing pad comprises a platform with one or more (preferably a pair of) elongate channels for aligning a helicopter on the landing pad by guiding the struts or skates of a helicopter's landing gear into a specific alignment upon landing. The guiding channels may be generally V-shaped, for example, with rollers to allow the weight of the helicopter to self-align along the direction of the channels as the craft touches down. Additional rollers at the bottom of the guiding channels, positioned down the center axis thereof, may allow the helicopter to be readily moved forward or backward to further adjust its position on the landing pad platform. The distance between the two guiding channels may be adjustable to fit to helicopters of different sizes. Optionally, the platform may have a blade locking arm or other member to keep the blade secured when the helicopter is parked, and further may include wheels allowing the platform to be towed as a unit, with the helicopter in place, to a storage facility.

In various forms and embodiments, the platform may include an electronic guidance system that, for example, may assist the pilot during landing by providing altitude or other information. The electronic guidance system may provide visual indications on the platform area instructing the pilot which direction to turn to align the craft. The system may also provide visual indications of the prevailing wind direction and/or velocity, through illuminated signals on the platform. Such information may also be transmitted to the helicopter for display in the cockpit, if the helicopter is so configured. In a preferred embodiment, the helicopter is configured with a guidance transmitter, such as an ultrasonic or RF transmitter, and the helicopter landing pad is configured with a plurality of corresponding receivers for detecting signals transmitted from the guidance transmitter, such that a processor may be utilized to determine the general location of the helicopter and thereby provide visual queues to the pilot. In certain embodiments, the platform may be automated and may be mechanized, so that it automatically turns to face the prevailing wind direction and/or to align itself appropriately with the incoming craft. Wind direction and velocity sensor inputs may be provided in connection with this functionality.

In yet other embodiments, a helicopter landing pad may include a platform and an integrated foldable and/or retractable container shell that can be extended around the craft after landing. The container shell may include, for example, a number of hinged panels that are folded and, in certain cases, slid beneath the platform when the helicopter is not present, and then pulled out and folded into the form of a container surrounding the helicopter after it has landed. The container shell may make storage of the helicopter significantly more convenient.

Further embodiments, variations and enhancements are also disclosed herein.

BRIEF DESCRIPTION OF THE DRAWINGS

FIG. 1 is a diagram showing an example of a helicopter landing pad having a platform with a pair of channels for aligning the struts of the helicopter landing gear, in accordance with one embodiment as disclosed herein.

FIG. 4A is an oblique view diagram illustrating further details of a landing pad guiding channel according to one embodiment, while FIG. 4B illustrates an example of the effect of central rollers in the landing pad channel in terms of aligning the helicopter landing gear in a forward/rearward direction.

FIGS. 14A and 14B are oblique and front view diagrams, respectively, illustrating the collapsible container shell after deployment.

DETAILED DESCRIPTION OF PREFERRED EMBODIMENT(S)

Figure 2A:
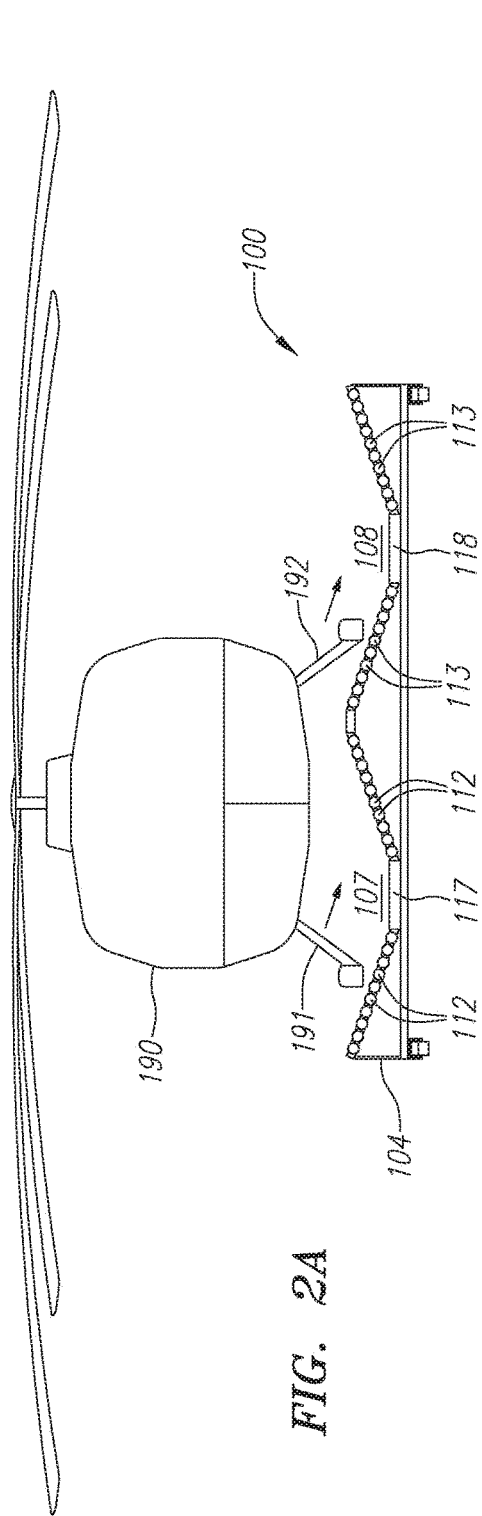
FIGS. 2A and 2B are front view diagrams illustrating operation of the helicopter landing pad of FIG. 1 in connection with a helicopter landing.

According to various embodiments as disclosed herein, an automated helipad may comprise a number of features to make landing easier and safer, and storage of the craft more convenient and more resistant to the elements. The automated helipad may include, for example, one or more of (i) a platform with a pair of channels for aligning the struts of the helicopter landing gear along a specific axis as the helicopter touches down; (ii) additional rollers positioned crosswise (transversely) down the center of the channels to allow the helicopter to be moved forward or backward to further adjust its position after landing; (iii) a blade-locking arm extension; (iv) an electronic wind direction indicator, which may be integrated with the blade-locking arm extension to form a multi-function extension member; (v) an automated landing guidance system; and (vi) a collapsible shell for housing and storing the craft after landing. Variations of the above, as well as other useful features, may also be incorporated in the novel helicopter landing pad disclosed herein.

FIG. 1 is a diagram of an example of a preferred helicopter landing pad 100, or helipad, in accordance with one embodiment as disclosed herein. In FIG. 1, the helipad 100 may include a platform base or frame 104 with a pair of generally parallel guiding channels 107, 108 for aligning the struts (also referred to as skids, skates or landing rails) of the helicopter landing gear along a specific axis. The guiding channels 107, 108 are preferably elongate and generally concave, and may be V-shaped as illustrated in FIG. 1, or else bowl-shaped or similarly shaped in a manner allowing the weight of the helicopter to self-align its direction upon touchdown. A plurality of rollers 112, 113, respectively, are oriented along the lengthwise axis of the guiding channels 107, 108, along both angled walls of each of the guiding channels 107, 108. The rollers 112, 113 may, but need not, extend across the entire length of the guiding channels 107, 108, as depicted in FIG. 1.

As explained in more detail hereinafter, a function of the rollers 112, 113 is to allow the weight of the helicopter to cause the craft to self-align along the low point (e.g., the centerline) of the guiding channels 107, 108 as the craft touches down, by guiding the landing rails (skates) 191, 192 of the helicopter 190 into a central position along the guiding channels 107, 108. Additional centerline rollers 117, 118 are preferably disposed crosswise down the center of each of the guiding channels 107, 108, respectively (assuming the lowest point of the guiding channels 107, 108 is along the center), to allow the helicopter 190 to be readily moved forward or backward to further adjust its position on the helipad base platform 104, after landing. The centerline rollers 117, 118 may, but need not, be of such number so as to continuously extend along the entire length of the guiding channels 107, 108; rather, several smaller pockets of centerline rollers 117, 118 may be sufficient for purposes of allowing the helicopter 190 to be moved forward or backward after landing.

The guiding channels 107, 108 are preferably spaced apart a distance corresponding to the width between the struts of a helicopter that will land on the helipad 100, and, in some embodiments, may be adjustable so that the width can be varied to suit different sized helicopters. The guiding channels 107, 108 each have gradually sloped walls that allow the weight of the helicopter to self-align along the center axis of the helipad 100. As noted above, the walls of the guiding channels 107, 108 may be generally V-shaped, or else they may be bowl-shaped, concave or otherwise gradually tapered to allow the helicopter to slide gently towards the lowest point of the channels 107, 108. The guiding channels 107, 108 are preferably of sufficient width to provide a meaningful landing target for the helicopter; for example, they may be at least two feet wide, and more particularly may be four to six feet wide, or else as wide as necessary to provide an adequate target for landing the helicopter.

Figure 2B:
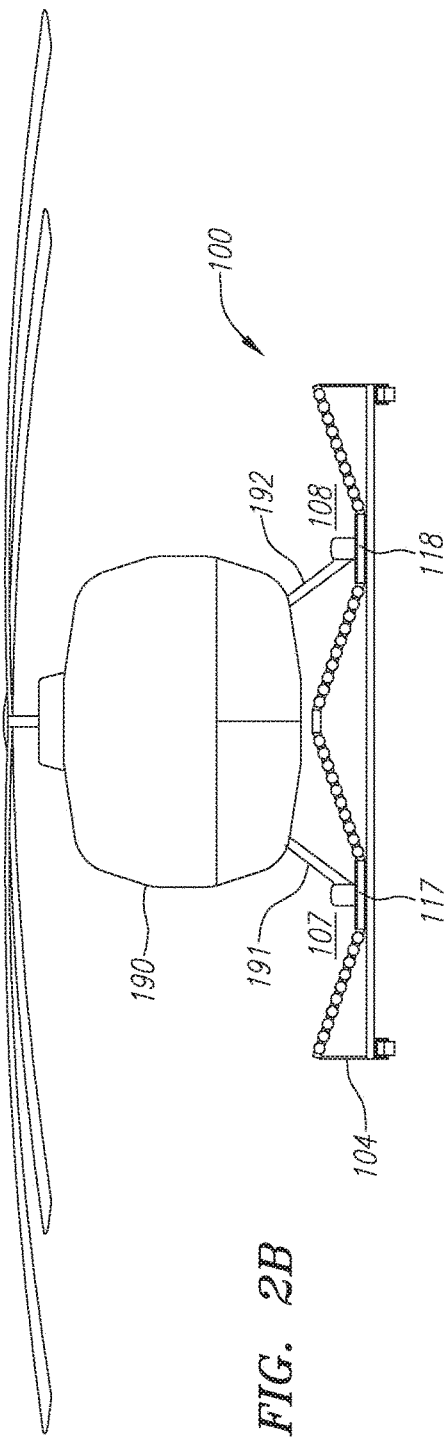

Further details of the operation of the helipad 100 may be explained with reference to FIGS. 2A and 2B, which are front view diagrams illustrating an example of a helicopter 190 approaching and landing on the helipad 100 shown in FIG. 1. During landing, the helicopter 190 preferably approaches the helipad 100 in the same direction as the general lengthwise axis of the guiding channels 107, 108. This process may be facilitated by mechanized or motorized rotation of the helipad 100 so that it aligns with the direction of approach of the helicopter 190, as described later herein, but in certain embodiments mechanical or motorized rotation of the helipad 100 may not be included. Once the helicopter 190 faces the same general direction of the guiding channels 107, 108, the helicopter 190 may descend onto the helipad 100. It may not be easy to maneuver the helicopter 190 to land precisely at the bottom of the guiding channels 107, 108, or to align in a perfectly straight direction. The helipad 190 facilitates landing through the use of the lengthwise rollers 112, 113 by allowing the helicopter skates 191, 192 to settle first anywhere along the guiding channels 107, 108, including the angled walls thereof. If the skates 191, 192 come to rest on the angled walls, as illustrated in FIG. 2A, then the rollers 112, 113 will cause the helicopter 190 to slide under its own weight down towards the center of the guiding channels 107, 108, eventually settling at the bottom of the guiding channels 107, 108 and resting rollers 117, 118, as shown in FIG. 2B.

Even if the helicopter 190 is not aligned perfectly straight along the lengthwise axis of the helipad 100 when touching down, or even if the back or front of the skates 191, 192 touch down first, the gentle slope of the angled walls will, in certain cases (depending on the angle and direction of approach), apply a cross-force to the skates 191, 192 when they contact the walls, forcing the free end of the skates 191, 192 to swing towards the angled walls and align with the direction of the guiding channels 107, 108. If the helicopter 190 is not perfectly aligned after touching down, or if it does not touch down in the center of guiding channels 107, 108, as the helicopter 190 rolls gently towards the center of the guiding channels 107, 108, whichever end of the helicopter 190 reaches the center channel area first, the other end of the helicopter 190 will swing gradually as it slides slowly downward to bring the helicopter 190 into substantially straight alignment with the guiding channels 107, 108.

Figure 4A:
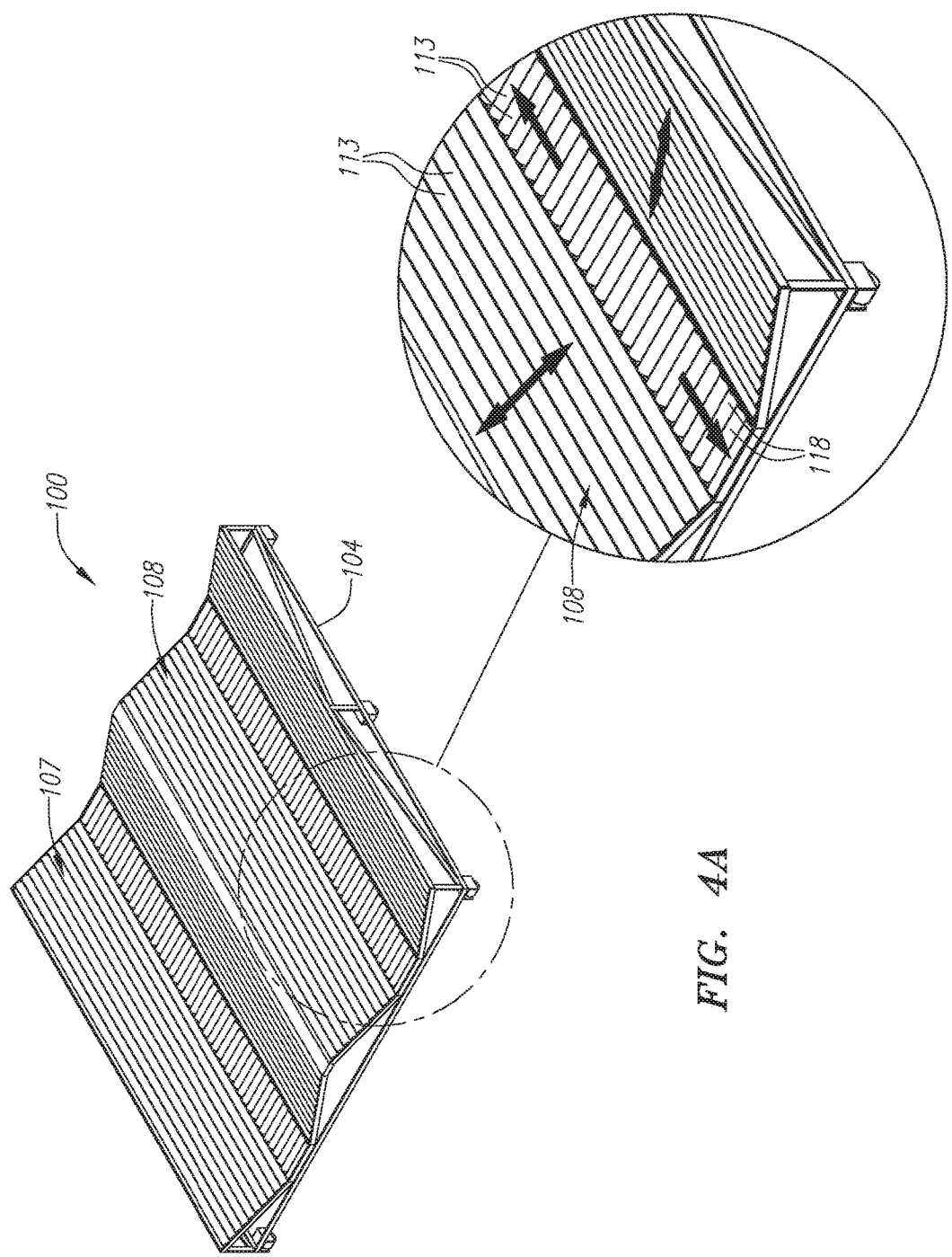

FIG. 4A is an oblique view diagram illustrating further details of the helicopter landing pad 100 if FIG. 1, with a closeup view of one of the guiding channels 108, according to one embodiment. As suggested by the dark double-arrows in the FIG. 4A closeup, when the helicopter 190 first touches down, the lengthwise rollers 113 on either side of the guiding channel 108 provide a relatively wide landing area for the helicopter 190, and further allow the helicopter 190 to straighten in whole or part if necessary and settle towards the center of the guiding channel 108 (and 107, not shown in FIG. 4A). Once the helicopter 190 has landed, it may be moved forward or backward in the guiding channels 107, 108 along rollers 117, 118, as indicated by the additional dark arrows in the FIG. 4A closeup, and also by the similar illustration of FIG. 4B showing the presence of the helicopter 190 after touch down. This capability may facilitate storage and securement of the helicopter 190.

The center rollers 117, 118 (some or all) can be mechanized or motorized, so that the helicopter 190 can be moved forward or backward automatically after landing. A cable or belt (not shown), for example, may be used to rotate the center rollers 117, 118 wrapping around portions of the rollers 117, 118 or axles thereof that extend slightly underneath the angled walls of the guiding channels 107, 108. In such a case, the cable or belt may engage with a gearwheel (not shown) located on the axle shaft and alongside the selected center rollers 117, 118. Other conventional or well known mechanisms may also be used for automatically rotating the center rollers 117, 118 in order to re-position the helicopter 190 after landing.

Figure 3:
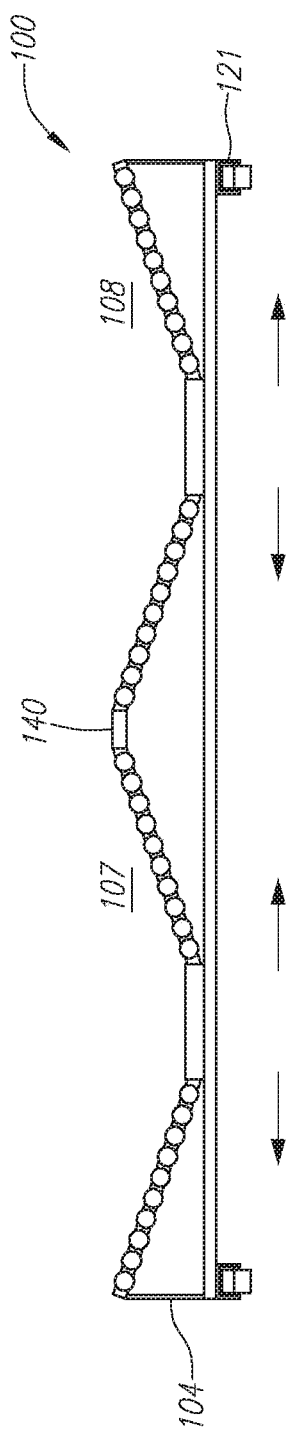
FIG. 3 is a diagram of the helicopter landing pad of FIG. 1 conceptually illustrating adjustment of the guiding channels in accordance with one embodiment as disclosed herein.

Not all helicopters are of the same size or have skates that are the same width apart, but the helipad 100 may preferably be configured so that they can be adjusted to fit helicopters of different sizes. FIG. 3 is a front view diagram conceptually illustrating adjustment of the landing pad channels of the helipad 100 of FIG. 1, in accordance with one embodiment as disclosed herein. The distance between the two guiding channels 107, 108 may be adjustable to fit to helicopters of different sizes. The guiding channels 107, 108 may be moved inward towards one another to accommodate smaller helicopters, and may be moved outward away from each other to accommodate larger helicopters. The relative width between the guiding channels 107, 108 can be adjusted by, for example, a wormgear or other similar mechanism that moves the center roller assembly of the guiding channels to the right or left. The wormgear or other similar mechanism can be operated by a manual crank, or else can be motorized or motor-assisted. The helipad 100 may be configured so that only one guiding channel adjusts right or left, but preferably allows both guiding channels 107, 108 to be adjusted—particularly when an enclosure is used (as in the embodiment of FIG. 10), so that the helicopter stays aligned along the centerline of the helicopter landing pad 100 rather than being slightly off to one side.

Adjustment of the guiding channels 107, 108 may also have the effect of altering slightly the angles of the sidewalls of the guiding channels 107, 108, and/or raising the center beam 140 between the guiding channels 107, 108. Optionally, a separate adjustment may be provided for the angle of the sidewalls, by, for example, raising or lowering the center beam 140 and/or support frame members 104. The width of the center beam 140 can be made adjustable (for example, by folding or overlapping metal sheets, or through a hinged support) in order to accommodate the changeable angles of the sidewalls. Alternatively, the helipad 100 may be constructed so that lengthwise rollers 112, 113 may be added or removed, so that as the sidewall angle is changed, the length of the sidewalls may change as necessary. Also, a centerbeam 140 need not be used, but rather a gap may be left between the guiding channels 107, 108 to allow adjustment therebetween. Many other techniques for adjusting the sidewall angle will be apparent to those skilled in the art of mechanical design.

The optimal angle of the "wedge" formed by the walls of the guiding channels 107, 108 can be determined by experimentation or otherwise. In FIGS. 1 and 3, the angle of the sidewalls is shown somewhat sharper than it would likely be in actual practice, but this is done for purposes of illustration. There may be some conditions in which a sharper angle is desirable.

Also, the width of the guiding channels 107, 108 can be more narrow, and need not extend fully across the helipad 100 as is illustrated by the embodiment of FIGS. 1 and 3. Rather, the guiding channels 107, 108 need only be as wide so as to permit safe landing conditions for the helicopter 190.

After the helicopter 190 has been centered on the helipad 100, it may be desirable to secure the helicopter 190 to prevent it from, e.g., being moved or damaged by the wind or otherwise. A clamp or latch (not shown) may be used to lock down the struts or skates of the helicopter 190 to prevent unwanted motion or disruption from the wind or transport. Such a clamp or latch, which may constitute a hook or other locking member, may automatically engage, or else may be manually operated.

Instead of side rollers 112, 113 in the guiding channels 107, 108, it is also possible to use other techniques to allow the helicopter 190 to settle in the channels. For example, it is possible to use a smooth or coated material such as Teflon (which may be disposed in strips), or any other material with a sufficiently smooth surface, to allow the helicopter 190 to slide towards the center of the guiding channels 107, 108. So long as the material has low enough friction, the helicopter 190 will be self-aligning.

Also, the guiding channels 107, 108 may be of a different shape, such as bowl-shaped (rather than wedge-shaped), and still function to allow the helicopter 190 to self-align under its weight.

It may be noted that many helicopters (such as the helicopter 190 illustrated in FIG. 1) do not have wheels; therefore, they can be difficult to transport after landing. Larger helicopters tend to have wheels and therefore can be towed. However, smaller helicopters (e.g., many 2-blade varieties) in particular often do not have wheels but only skates. Conventionally, to tow such a helicopter, wheels are fitted under the skates after the helicopter is raised with a jack. A cart is then brought up to the from of the helicopter and hooks to a tow bar beneath the helicopter's nose. The cart is then used to tow the helicopter. However, this takes time and labor, and is inconvenient.

Embodiments of a self-aligning helipad as disclosed herein may be readily towed, without using a jack to raise the helicopter and without needed to place wheels beneath the helicopter skates, thereby saving time and effort.

In a preferred embodiment, the helipad 100 is outfitted with wheels 121, as shown in FIG. 1, so that the helipad 100, with the helicopter 190 atop it, can be towed immediately after landing. The helipad 100 is preferably configured with a tow bar to allow ready towing by, e.g., a cart or small vehicle. These features can save helicopter users substantial time and prevent inconvenience.

The platform base or frame 104 may, as illustrated in FIG. 1, constitute a set of interconnected beams, bars or tubes formed of aluminum, stainless steel, or other suitably durable and weather-resistant material. Constructing the frame 104 from a skeleton of beams or tubes may reduce the helipad's weight and cost, and also make it easier and lighter for towing purposes.

Optionally, in addition to being provided with wheels allowing the helicopter to be towed with the helipad as a unit, the helipad platform may also be outfitted with a blade locking arm or member to keep the helicopter blade secured when the helicopter is parked, and which may, if desired, serve other additional purposes as well as described herein.

Figure 5:
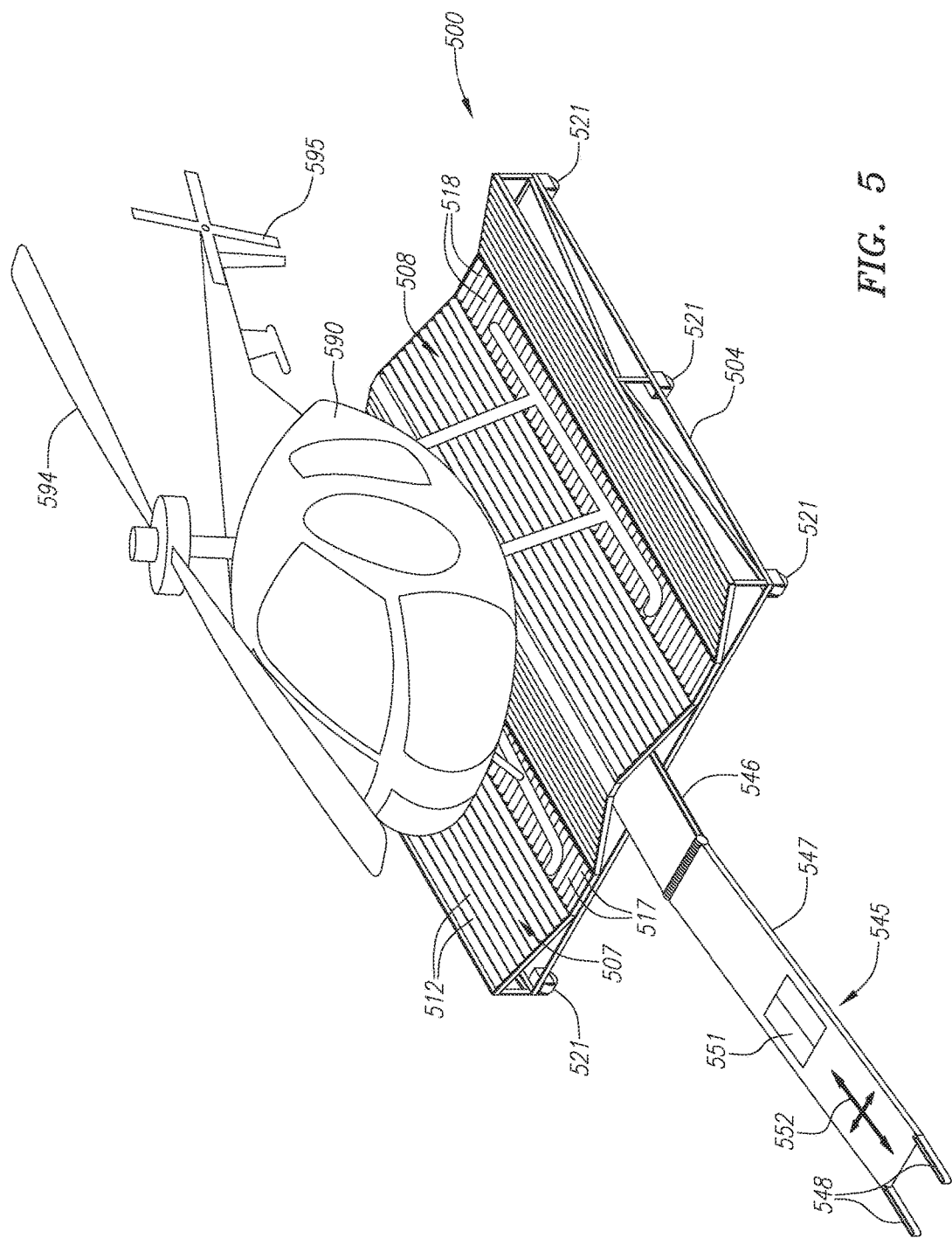
FIG. 5 is a diagram of a helicopter landing pad similar to FIG. 1, and including an example of a multi-functional extension member.

FIG. 5 is a diagram of a helicopter landing pad or helipad 500 similar to FIG. 1, including an example of a blade locking arm in the form of a multi-functional extension member 545. Similar to FIG. 1, the helipad 500 in this embodiment has guiding channels 507, 508 outfitted with lengthwise rollers 512, 513, as well as having central rollers 517, 518 in the troughs of each of the guiding channels 507, 508. In general, elements numbered "5xx" in FIG. 5 correspond to similar elements numbered "1xx" in FIG. 1.

Figure 6A:
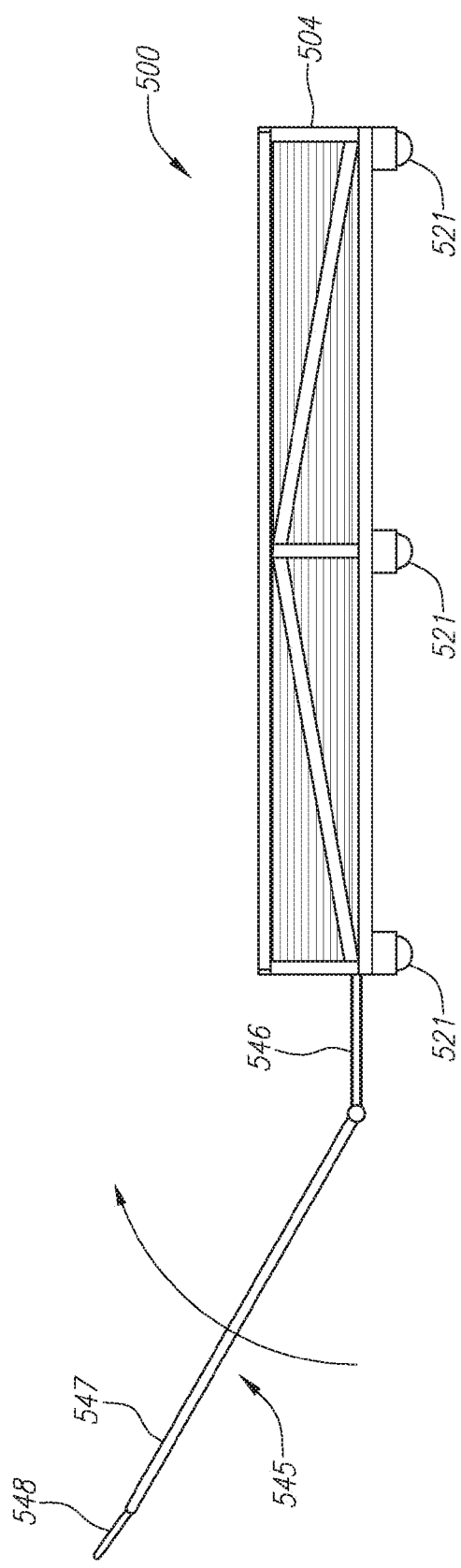
FIGS. 6A and 6B are side view diagrams illustrating an example of a potential use of a multi-functional extension member as a blade locking mechanism, in accordance with one embodiment.
Figure 6B:
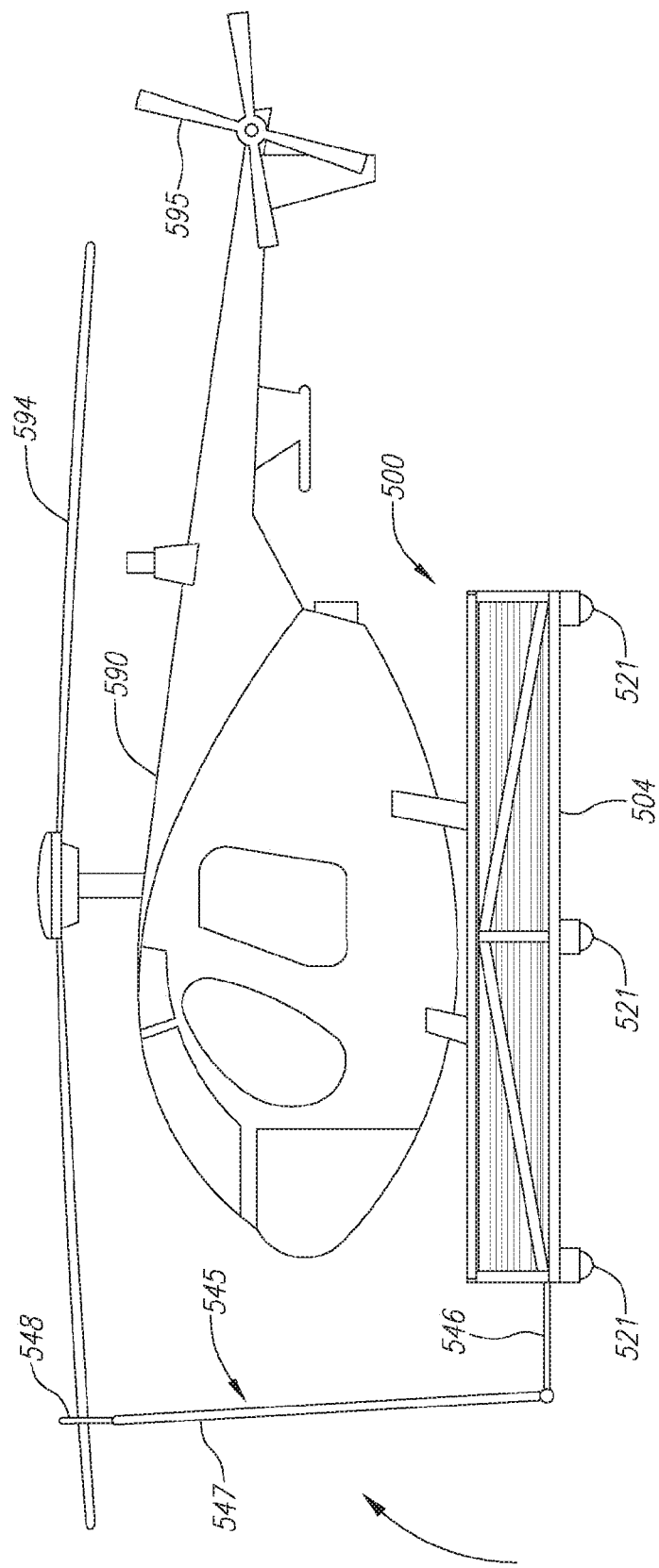

A preferred construction and operation of the multi-functional extension member 545 as a blade-locking arm or clamp may be illustrated by the side view diagrams of FIGS. 6A and 6B. As shown first in FIG. 6A, the multi-functional extension member 545 may, for example, have a support member 546, a hinged arm 547, and a clamp member 548. When, as shown in FIG. 6B, a helicopter 590 lands, the pilot generally will stop the top blade 594 with a "blade brake" accessible in the cockpit or cabin. If the top blade 594 is not centered upon landing, then it typically can be re-positioned after landing by turning the rear rotor blade 595; this forces the top blade to a designated position. Once the top blade 594 is centered, the hinged arm 547 of the multi-functional extension member 545 may be swung up so that the clamp member 548 locks the top blade 594 into position, aligned with the direction of the helicopter 590.

The hinged arm 547 may be motorized so that it automatically swings up to "cage" the top blade 594, or else it may be manually swung up into position. The blade clamp member 548 is preferably made of a soft or pliable material (such as soft rubber), or lined with such, to avoid damage to the fragile top blade 594 while nonetheless limiting movement of the blade 594. The blade clamp member 548 may, for example, be embodied as a two-prong fork-like structure, as illustrated best in FIG. 5, with the prongs functioning to limit sideways blade motion. Alternatively, the blade clamp member 548 may be shaped as a hook, deadeye, etc., so long as it has sufficient clearance to avoid interfering with the tip of the top blade 594.

The multi-function extension member 545 may, if desired, be extendable, height-adjustable and/or foldable. The extension member 545 can be configured to slide out from underneath the platform 504 of the helicopter landing pad 500, in order to make the overall dimensions smaller for storage when the helicopter 590 is not on the pad, and also to prevent damage to the extension member 545 when not in use.

In various embodiments, a towable landing pad with a blade lock capability can be very useful in a variety of settings; for example, for parking multiple helicopters next to each other, as may be done, e.g., in police or military environments. In these settings, as well as others, helicopters after landing generally need to be towed to a storage facility, and likewise need to be towed from storage out to the helipad for takeoff. A blade lock mechanism as described herein can help narrow the profile of the helicopter, thus minimizing the storage area needed.

In some embodiments, the helipad platform may include a guidance system that, for example, provides altitude or other information to the helicopter pilot during landing, and may further provide visual indications on the platform instructing the pilot which direction to turn to align the craft. The system may also provide visual indications of the prevailing wind direction and/or velocity, through illuminated signals on the platform. In certain embodiments, the platform may be automated and may be mechanized, so that it automatically turns to face the prevailing wind direction or to align itself appropriately with the incoming craft.

Figure 7:
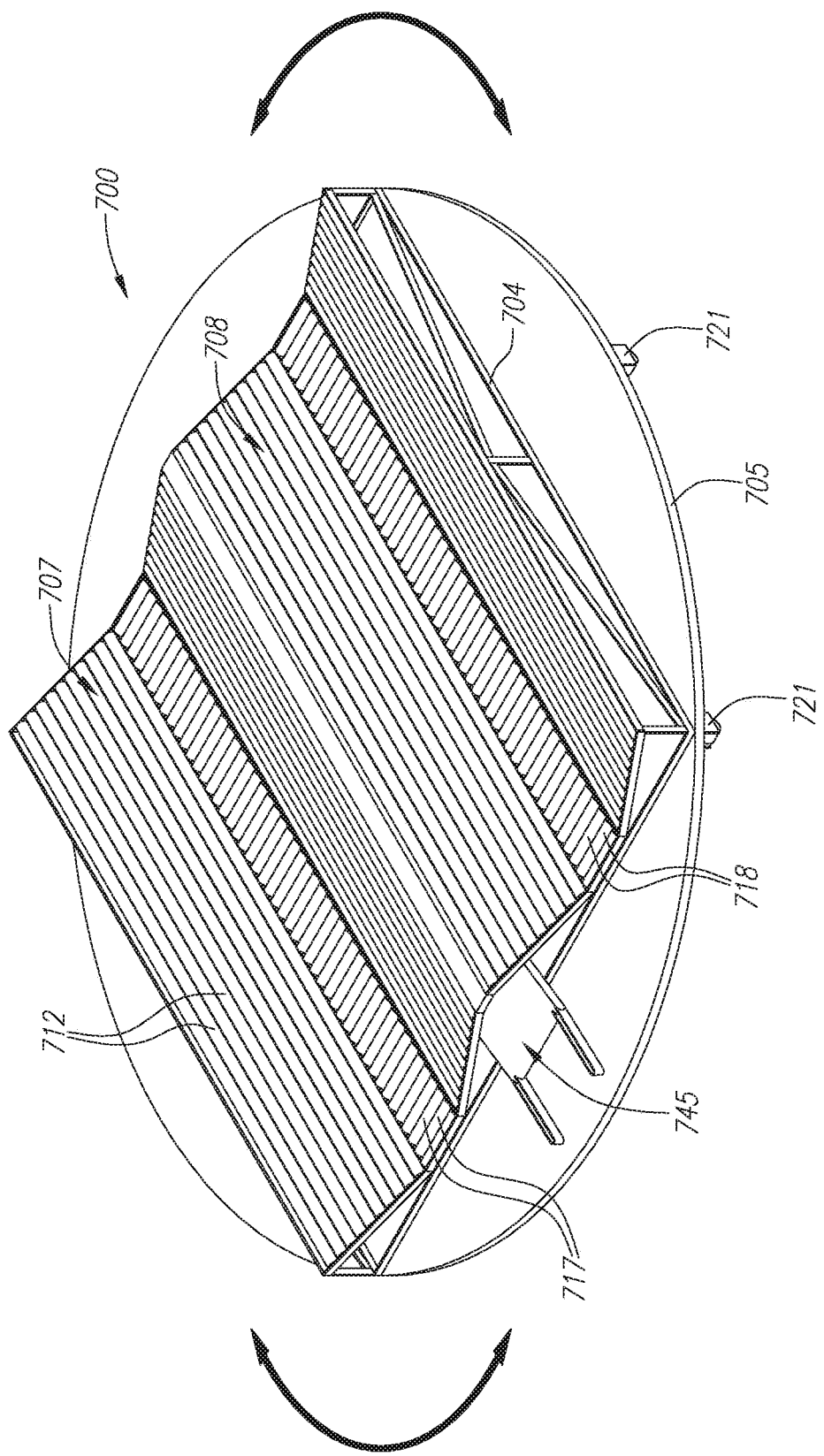
FIG. 7 is an oblique view diagram of another embodiment of a helicopter landing pad, having rotation capability.

FIG. 7 is a diagram of one embodiment of a helicopter landing pad or helipad 700, having rotational capability. Like FIG. 1, the diagram of FIG. 7 is an oblique view, showing a helipad 700 that includes a rotatable platform 704 positioned above a platform base 705. The rotatable platform 704 may be constructed in a similar manner to the helipad 100 of FIG. 1, with a platform frame (of e.g., interlocking beams, bars or tubes) having two guiding channels 107, 108 each with a set of lengthwise rollers 712, 713 for self-aligning a helicopter, and a set of central rollers 717, 718 that may, for example, be used to re-position the helicopter towards the front or back of the guiding channels 707, 708. The rotatable platform 704 is affixed to the platform base 705, and preferably rotates in a circular fashion around the center axis of the platform base 705 (similar to a turntable). Thus, a central wheel or axle (not shown) may support the rotatable platform, allowing it to rotate relative to the platform base 705. The platform base 705 may, as with the helipad 100 of FIG. 1, be outfitted with wheels 721 for facilitating transport of the unit by itself, or with the helicopter atop it.

The rotatable platform 704 may be rotated either manually or with motorized assistance. Because the platform 704 can be relatively small, it should not be difficult to rotate it in an automated fashion, particularly before the helicopter has landed. A wide variety of conventional motors (electrical or otherwise), connected to the central axis or wheel by gear(s) or cable(s), may be employed to rotate the rotatable platform 704 in an automated or semi-automated manner.

Alternatively, in other embodiments, the upper platform 704 may be outfitted with a plurality of wheels (not shown) along the bottom of the frame, locked into a grooved track along the circular frame member 705, for added support of the guiding channels, or else wheels may be located beneath the center of each of the guiding channels. The wheels may facilitate rotation of the upper platform 704 and/or provide additional support therefor. The helipad 700 may also be outfitted with a multi-function extension member 745 or other blade-locking member, as previously described in connection with FIG. 5.

The helipad 700 may include, or be connected to, a wind direction sensor such as a weather vane that responds to the prevailing wind direction, and a wind speed sensor. The orientation of the weather vane or other wind direction sensor may be electronically sensed, providing a control input for the helipad 700. The helipad 700 may further be outfitted with an electronic controller (not shown) that responds to the wind direction sensor, and orients the direction of the platform 704 automatically in response to the wind direction, by activating a motor controller that rotates the cable(s), gear(s), axle(s) or other movable members that cause rotation of the platform 704. The electronic controller may be programmed so as to limit the speed and frequency of platform adjustment, to ensure that the platform does not change direction too quickly as the helicopter begins its approach. The electronic controller may also interface with a transceiver (not shown), which may be a radio frequency (RF) transceiver, that may be integral with or connected to the helipad, for communication with an approaching helicopter. According to one embodiment, the electronic controller does not begin rotation of the helipad platform 704 until receiving an instruction that a helicopter is approaching for landing; this instruction may be conveyed directly from the approaching helicopter and received at the RF transceiver of the helipad 700.

The helipad 700 may provide particular advantages for safely landing helicopters in a large variety of conditions. Helicopters generally fly into the wind in order to land, which improves the stability of the helicopter as it approaches the landing pad. It will often occur that the landing pad is in a different direction than the wind direction, relative to the helicopter. In order to land the helicopter, the pilot may face the helicopter into the wind while migrating along the flight path, traveling sideways to reach the landing area. Then, at the last second, the pilot straightens out the helicopter to touch down on the landing pad.

Landing a helicopter in the presence of wind thus presents a number of challenges. For example, it can be difficult to approach and maneuver the helicopter onto the landing pad in the presence of wind. It can also be difficult for a helicopter pilot to identify the actual wind direction. Also, if the wind suddenly changes, the pilot needs to be alerted somehow to the change, and his or her reactions need to be fast enough to respond to it. Often, landing areas or small airports are provided with a wind sock that helps an approaching pilot by visually signifying the wind direction, but determining the actual wind direction by viewing a wind sock may require some judgment and experience on behalf the pilot. Also, shifts in the wind direction may be missed as the pilot will be focused on the landing pad when nearing approach.

In certain embodiments, the rotatable helipad 700 may facilitate landing of a helicopter by turning the direction of the guiding channels 707, 708 into the same direction as the wind, thereby making it easier for the pilot to land the helicopter. The helicopter can then be landed without the pilot having to turn at the last minute when touching down the aircraft.

This capability may be particularly important and useful with ships at sea that have helipads. Often, a ship must turn into the wind to allow a helicopter to land safely on the ship's helipad. Smaller boats are less stable than larger ones, so that as the helicopter approaches the ship's helipad, the boat may not be precisely oriented against the wind. Even after a ship turns to sail into the wind, changes in the wind direction can occur, thus disrupting the helicopter's safe approach and landing. Because ships are generally large and heavy, the react slowly to changes in wind direction.

A rotatable helipad 700 may find particular utility deployed on a ship. Rather than the ship turning into the wind, the platform 704 of the helipad 700 may be rotated to align in the direction of the wind independent of the ship's direction, thus facilitating the safe approach and landing of the helicopter. The rotatable helipad 700 allows the ability to turn the platform 704 so that the direction of the guiding channels 707, 708 face in the same direction as the wind, thereby making it easier for the pilot to land the helicopter. The helicopter can then be landed without the pilot having to turn at the last minute when touching down the aircraft. If wind changes direction, then the platform 704 can quickly adjust to compensate. In some settings, where the helipad 700 is automated, it may be desirable to program the helipad 700 so that the platform 704 does not rotate any further once the helicopter is within a very close range, e.g., within 10 feet (or some other suitable range).

In various forms and embodiments, as noted, the helipad may include a guidance system that provides altitude or other information to the helicopter pilot during landing, along with visual indications of prevailing wind direction and/or velocity, and/or other indications on the platform instructing the pilot which direction to turn to align the craft. Returning to the embodiment shown in FIG. 5, the multi-function extension member 545 may optionally be outfitted with a wind direction indicator 552 and wind speed indicator 551, which may take the form of a large LED display. In this version, the helipad 500 is preferably connected, via electronic cables or a wireless connection, to a windspeed sensor and a wind direction detector (not shown). A variety of windspeed sensors and wind direction detectors useful for this purpose are known in the art. For example, a simple wind vane may be used to detect the wind direction, and the position of the wind vane can be mechanically or electronically measured, as can the force of the wind. These devices may be located nearby the helipad 500, or else may be integrated therewith. An electronic controller (which may be embodied, for example, as an embedded microprocessor or other digital controller) may receive inputs from the windspeed sensor and wind direction detector, and may control the indicators 551, 552 in response thereto.

The indicators 551, 552 may be embodied as illuminated signal displays. In particular, the wind direction indicator 552 may be embodied as four (or more) independently controllable illuminating directional arrows, and the wind speed indicator 551 may be embodied as an illuminated numerical readout. The indicators 551, 552 may be composed of LED-based display elements, or else may utilize other types of lighting. Preferably, the indicators 551, 552 are illuminated in red or another easily visible color. The display indicator(s) 551, 552 may also be color-coded such that, for example, lower wind speeds are displayed in one color (e.g., green), mid-range wind speeds are displayed in another color (e.g., yellow or orange), and high wind speeds are displayed in yet another color (e.g., red).

According to one example of possible operation, as a helicopter approaches for landing, the electronic controller causes the wind speed indicator 551 and wind direction indicator 552 to indicate the speed and direction, respectively, of the prevailing wind conditions to the pilot. If the multi-function extension member 545 is not already deployed when the helicopter indicates its approach, the electronic controller may automatically deploy the multi-function extension member 545 by activating its motor control, assuming that it is automated. Then, in response to the wind direction sensor, the electronic controller illuminates the appropriate arrow of the wind direction indicator 552, and in response to the windspeed detector, displays the wind speed (and units if appropriate), e.g., "35" or "35 MPH", on the wind speed indicator 551. This information can be of vital assistance when a pilot is attempting to land in the presence of wind. For example, it may allow the pilot to approach the landing pad 500 while facing the helicopter towards the wind, if desired.

Although the wind speed and direction indicators 551, 552 are shown in FIG. 5 as part of the multi-function extension member 545, they may alternatively be located elsewhere, at any other conveniently visible location on the helipad 500 or even on a module that is attached to but physically separate from the helipad 500.

Figure 8:
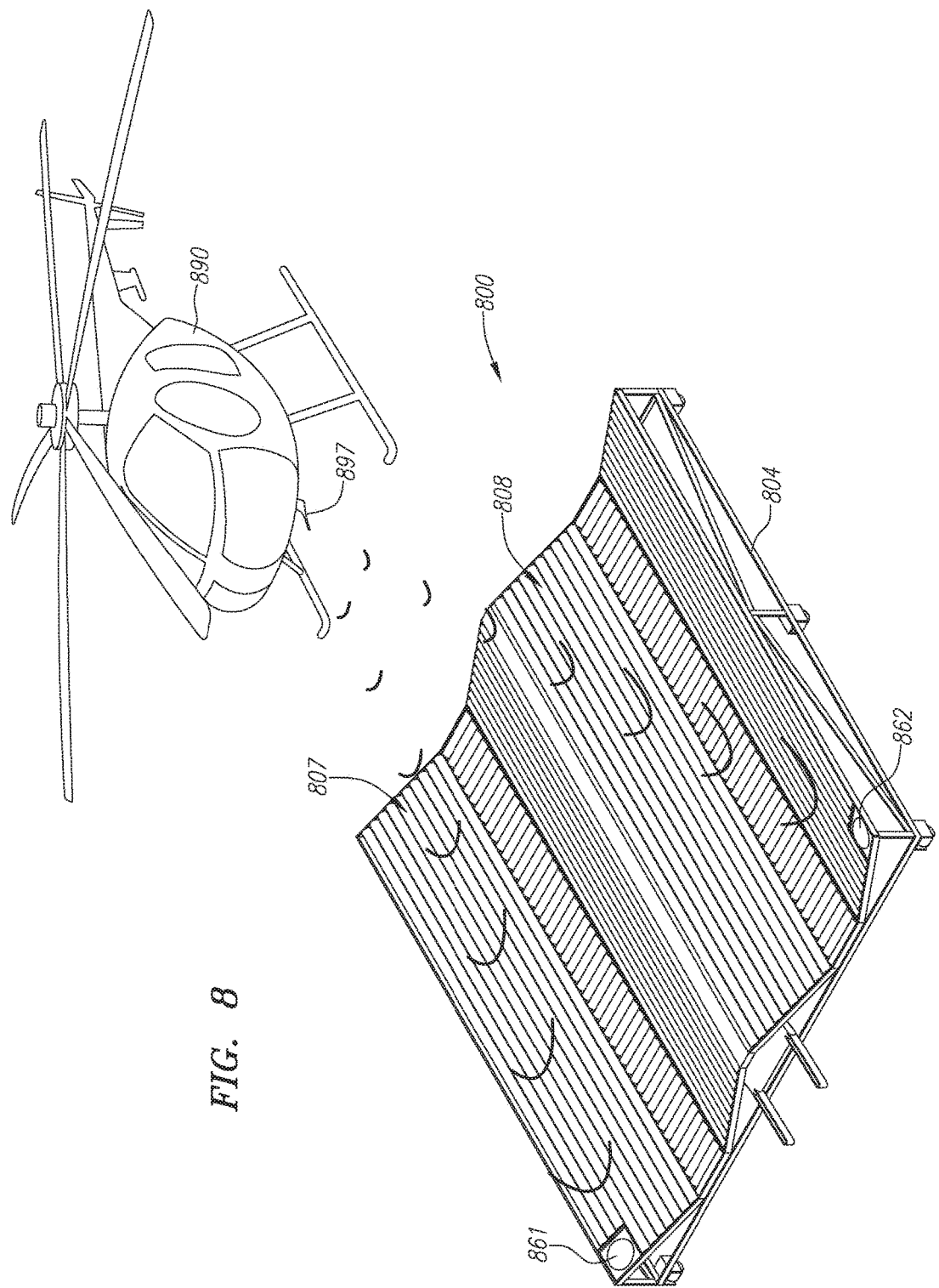
FIG. 8 is a diagram illustrating an example of another embodiment of a helicopter landing pad, having an additional landing guidance capability.

FIG. 8 is a diagram illustrating an example of another embodiment of a helicopter landing pad or helipad 800, having an additional landing guidance capability. In the embodiment of FIG. 8, the helipad is outfitted with two (or more) positionally dispersed sensors 861, 862, which may be connected to an electronic controller or processor (not shown) that controls various aspects of the helipad 800. As before, the electronic controller may comprise an embedded microprocessor or other digital controller, and may also function to control the wind speed or direction indicators, if provided. While the sensors 861, 861 are illustrated as integral with the helipad 800, they may also be portable and, for example, may communicate with the electronic controller via a cable or wireless interconnection. In a preferred embodiment, the helicopter 890 is configured with a communication unit 897 (which may be a transmitter or transceiver) that periodically transmits recognizable signals (which may be, e.g., radio-frequency (RF) or ultrasonic signals for example), and the sensors 861, 862 on the helipad 800 receive the signals and provide them to the electronic controller for processing. The electronic controller uses the information received by the sensors 861, 862 to determine the position of the helicopter 890 as it approaches, in order to facilitate the helicopter's landing.

According to one embodiment, the electronic controller uses information detected by the sensors 861, 862, such as the relative timing information of the received signals, potentially in combination with other analytical information, to determine the helicopter's general position. In response, the electronic controller may illuminate indicia, such as lighted arrows (not shown in FIG. 8), to direct the pilot in the appropriate direction in order for the helicopter 890 to be centered along the center axis of the helipad 800. The lighted arrows are preferably visible to the pilot of an approaching helicopter, and may be embodied as LED-based lights integral with the helipad 800 or else a separate light fixture or stand placed in front of the helipad 800 and connected thereto by an electronic cable. As noted previously various indicators (such as 551 and 552 in FIG. 5) can also indicate wind speed and wind direction to the approaching pilot.

If the helipad 800 has an auto-rotation capability, as discussed previously with the embodiment of FIG. 7, then the electronic controller may optionally use the information about the helicopter's approaching trajectory to rotate the platform 704 to align the guiding channels 707, 708 with the approaching helicopter 890. Note that, at least in certain embodiments, the helicopter 890 needs no complex electronic circuitry or processing capability to interface with the helipad 800; rather, the helicopter 890 can be outfitted with a simple transmitter as the communication unit 897. However, as noted previously, the helicopter communication unit 897 may also take the form of a transceiver rather than simply a transmitter.

Depending on the desired capabilities and the nature of the environment, the communication unit 897 may transmit (and optionally receive) according to any number of suitable protocols or using any of a number of transmission techniques. The transmitter of the communication unit 897 may digitally encode the transmissions, or add error correction information, or take other steps to increase the resistance of the signals to noise and to ensure the integrity of the signals being received by the sensors 861, 862. The transmission rate of the communication unit 897 is preferably selected so that the electronic controller at the helipad 800 can discern the relative position of the helicopter by comparing the relative time of arrival of the signal from the helicopter's communication unit 897.

Figure 9A:
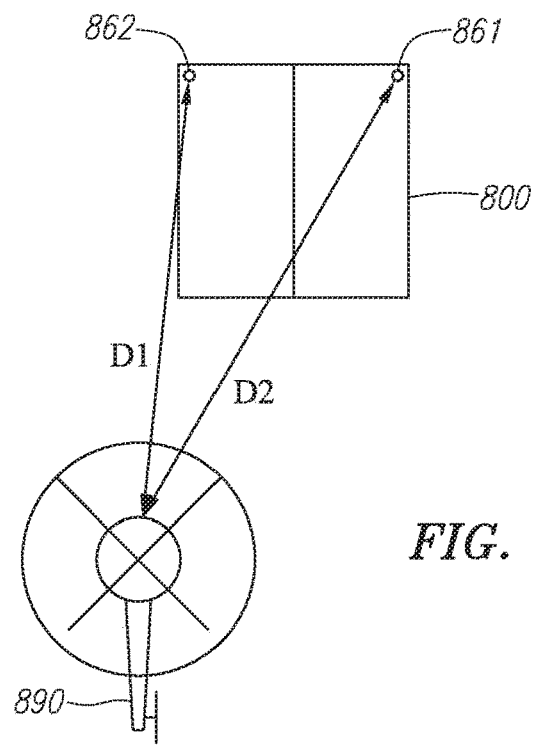
FIGS. 9A and 9B are top view diagrams illustrating an example of operation of one type of landing guidance system as may be used in conjunction with various embodiments of the novel helicopter landing pad disclosed herein.
Figure 9B:
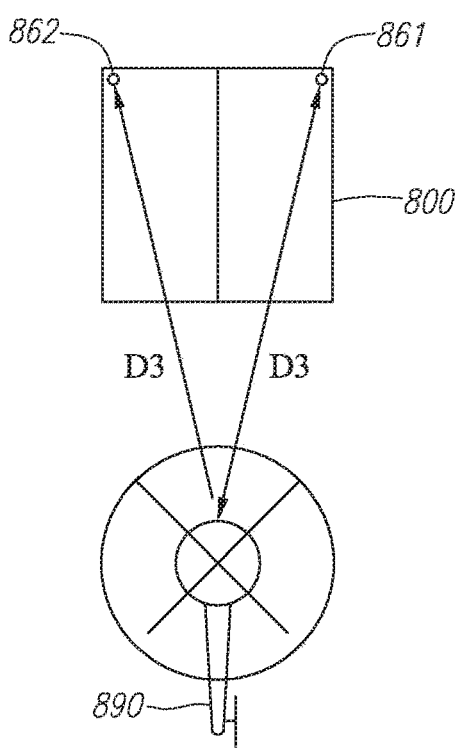

FIGS. 9A and 9B are diagrams illustrating an example of how a landing guidance system according to one or more embodiments may be used in conjunction with a helicopter landing pad disclosed herein. As shown in FIG. 9A, when a helicopter 890 approaches the helipad 800 without being aligned along the center axis of the helipad 800, there will be a discrepancy in the relative arrival times of the signal from the helicopter's communication unit as detected by sensors 861 and 862, reflecting the slight difference in distances D1 and D2 between the sensors 862, 861 and the helicopter 890. This information can be used by the electronic controller 890 of the helipad 800 to direct the pilot of the helicopter 890 to bear the appropriate direction; in this example, the pilot (via lighted indicia on the helipad 800, or otherwise) would be instructed to bear to the right. When the helicopter 890 is substantially aligned with the center axis of the helipad 800 (and hence the guiding channels 807, 808), as shown in FIG. 9B and as indicated by the same distance D3 to each sensor 861, 862, the electronic controller may affirmatively signal that the helicopter is on track, or else simply not illuminate or convey any instructions to alter course.

If the communication unit 897 of the helicopter 890 is configured with a receiver, then the sensors 861, 862 may alternatively act as signal beacons. In this case, each of the beacons sends out a unique signal, code or pattern. The beacon signals are synchronized so that the signals are in temporal alignment. The communication unit 897 of the helicopter 890 receives the beacon signals and, based on the relative timing therefrom, provides an instruction or indication to the pilot as to how to maneuver the trajectory of the helicopter 800 to align it more centrally with the helipad 800. The communication unit 897 may interface with the helicopter's instrument landing system (ILS) to provide information to the pilot, depending upon the specific instruments available in the helicopter 890. For example, the helicopter 890 may have among its instrumentation a display indicating to the pilot the relative location of the helipad 800 and helicopter 890, as well as an arrow or other indicia showing which way to maneuver the helicopter 890 to centrally align it with the helipad 800. This type of display system may be especially helpful where the helicopter 890 is directly above the helipad 800, or where the pilot is not suitably positioned to see a display indicia that is on or adjacent to the helipad 800.

In some embodiments, it may be desirable to also convey to the pilot an indication of the helicopter's altitude. The communication unit 897 may (optionally in conjunction with the helicopter's instrumentation system) calculate the helicopter's altitude based on, for example, timing information from the beacon signals. This can be accomplished in a variety of manners. The beacon signals may, for example, include a precise timing indicator that is synchronized with the helicopter's instrumentation system. Alternatively, the helicopter 890 may transmit a signal to the beacons, that is then relayed back to the helicopter 890 which uses the round trip turnaround time (potentially in combination with other information) to determine the helicopter's altitude. Optionally, a third sensor or beacon may be added to the helipad 800 in order to measure the helicopter's altitude more precisely. In such a case, triangulation principles may be used to determine the altitude of the helicopter. The helicopter may also have a radar altimeter which conveys altitude information to the pilot.

Figure 10:
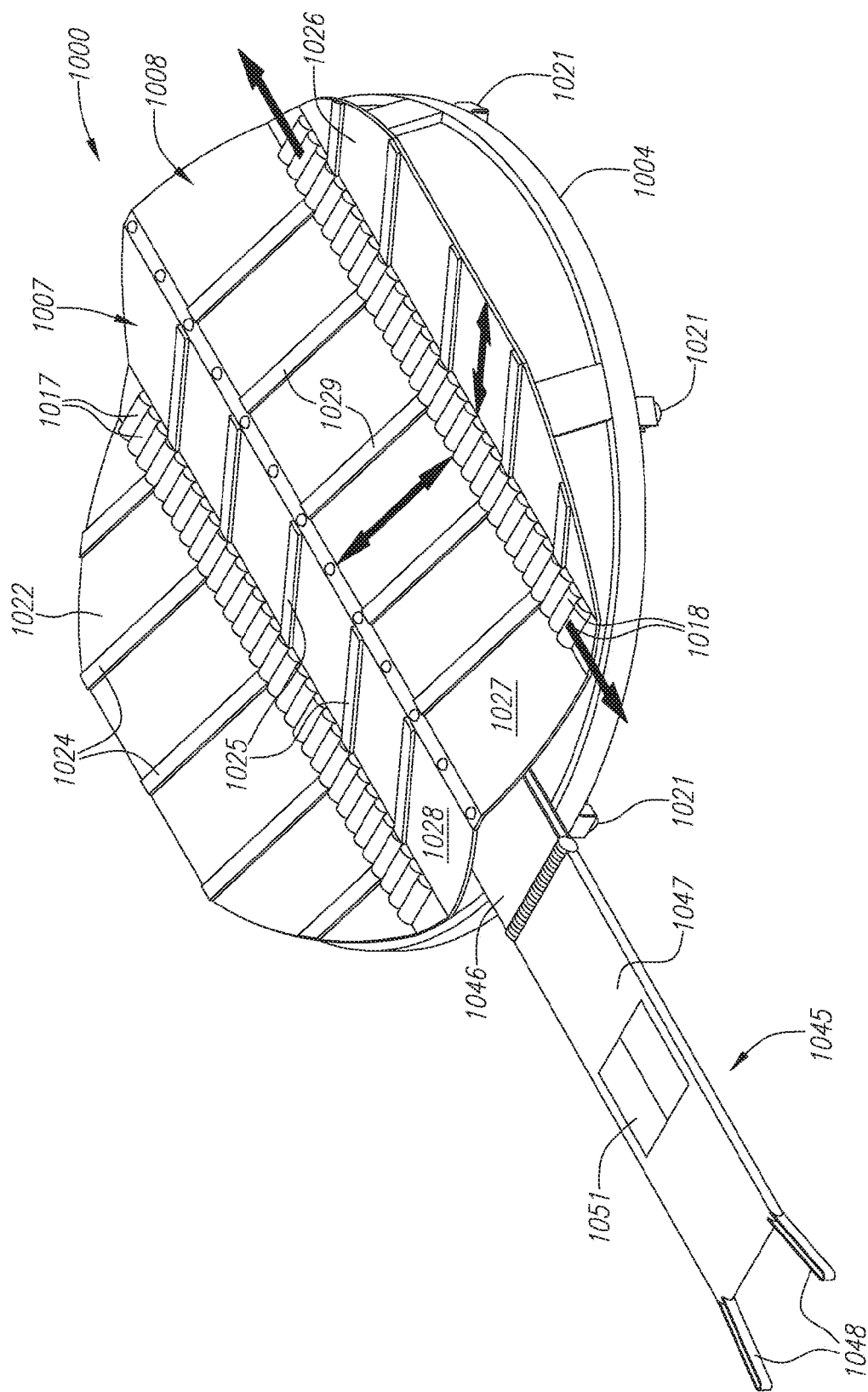
FIG. 10 is an oblique view diagram of an embodiment of a helicopter landing pad having a generally circular platform.

In other embodiments, a helicopter landing pad or helipad may be constructed in shapes that are not substantially square or rectangular. FIG. 10, for example, is an oblique view diagram of an embodiment of a helicopter landing pad or helipad 1000 having a generally circular upper platform. The helipad 1000 is similar to that of FIG. 7, with a pair of guiding channels 1007, 1008 for aligning the struts or skates of a helicopter landing on the pad 1000. However, the upper platform of the helipad 1000 is generally circular (when viewed from the top). The upper platform may, as previously described, be rotatable in nature. Unlike the helipad depicted in FIG. 7, the helipad 1000 of FIG. 10 is illustrated as having sets of strips 1024, 1025, 1028, 1029 of smooth material for allowing the struts or skates of the helicopter to slide under the helicopter's weight to the center of the guiding channels 1007, 1008. The first guiding channel 1007 has two panels 1022 and 1023 which support the first set of smooth strips 1024 and second set of smooth strips 1025, respectively, while the second guiding channel 1008 has two other panels 1026 and 1027 which respectively support the other two sets of smooth strips 1028, 1029. Transverse central rollers 1017, 1018 may be provided down the middle of each of the guiding channels 1007, 1008, similar to the embodiment of FIGS. 1 and 5, for allowing the helicopter to be more readily moved forward or backward after landing.

Similar to the helipad of FIG. 5, the helipad 1000 illustrated in FIG. 10 also has a retractable multi-function extension member 1045 that may include a base member 1046, a hinged arm member 1047, and a blade clamp 1048, all as previously described in connection with FIG. 5. The circular upper platform of the helipad 1000 may be supported by a frame or support bars attached to the base and disposed along the outer periphery of the upper platform (that is, along the outer edges of the guiding channels 1007, 1008 as shown in FIG. 10). Wheels 1021 may be provided underneath the bottom of the base for allowing the unit to be transported for stowage or otherwise, either with or without the helicopter atop it.

In yet other embodiments, a helicopter landing pad or helipad system may include a platform and a portable outer housing for protecting or stowing the helicopter after landing, such as an integrated foldable and/or retractable container shell that can be extended around the craft after landing. The container shell may include, for example, a number of hinged panels that are folded and slid beneath the platform when the helicopter is not present, and then pulled out and folded into the form of a container surrounding the helicopter after it has landed. Such a container shell may make storage of the helicopter significantly more convenient.

Figure 11:
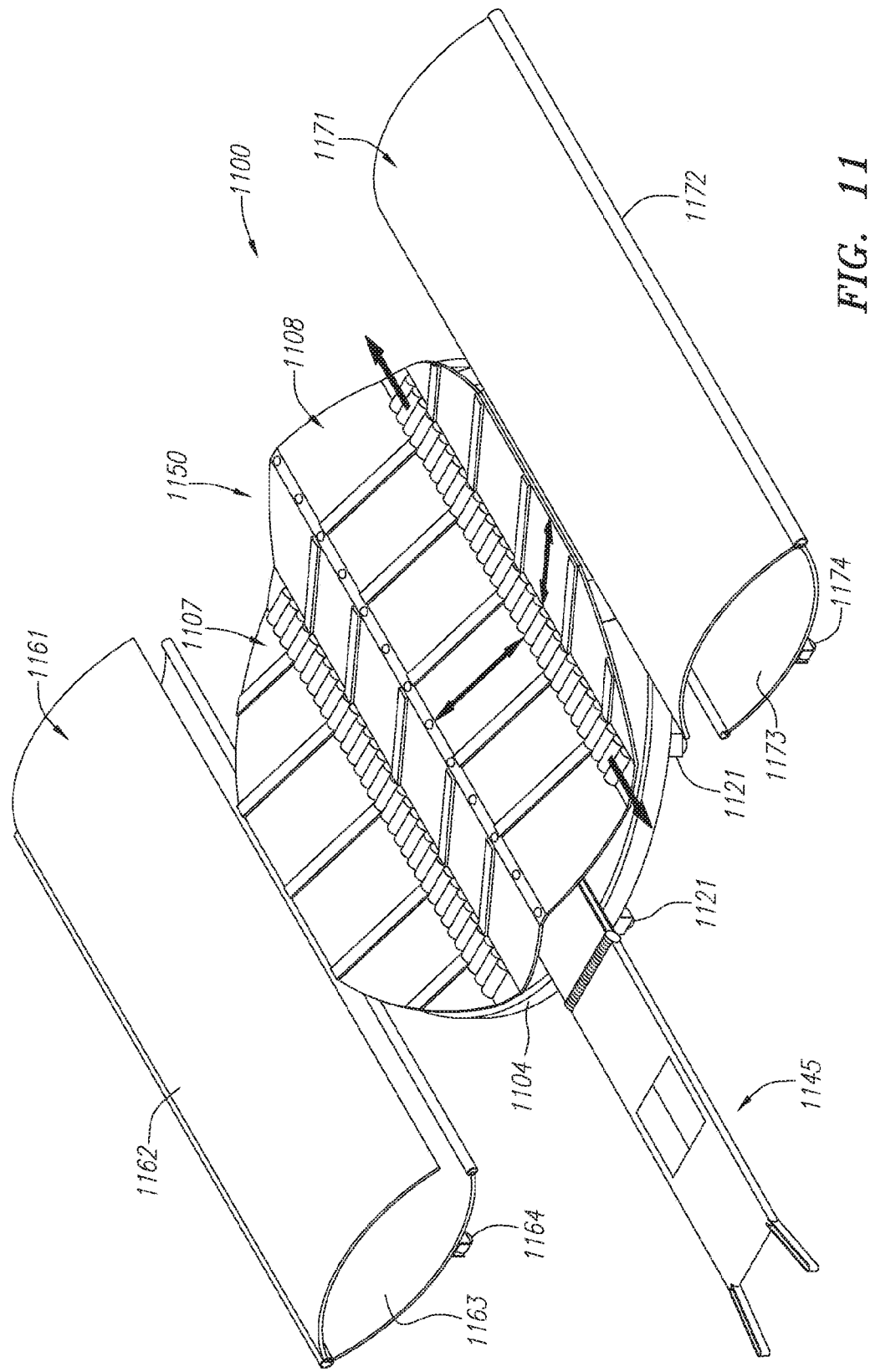
FIG. 11 is an oblique view diagram of a helicopter landing pad similar to that of FIG. 10, and also including a collapsible enclosure shown in a retracted or open position.

FIG. 11 is an oblique view diagram of an example of a helicopter landing pad 1100 generally similar to that of FIG. 10, having a collapsible outer enclosure for protecting the helicopter after landing. As with FIG. 10, the embodiment of FIG. 11 is depicted with a circular upper platform (that is preferably automatically rotatable) having a pair of guiding channels 1007, 1008, which generally are constructed as described for FIG. 10 (although they may alternatively be constructed with lengthwise rollers as previously shown in FIG. 1, for instance). The helipad 1100 of FIG. 11 also has a multi-function extension member 1145 that may be constructed in a manner similar to the versions previously described herein. In the embodiment of FIG. 11, the collapsible enclosure is formed from two collapsible clam-shell outer enclosure members 1161, 1171, shown in FIG. 11 in a retracted or collapsed position. The outer enclosure members 1161, 1162 are, in this example, formed of folding enclosure panels 1162, 1163, 1172, and 1173. The outer enclosure members 1161, 1171 are preferably outfitted with a set of wheels 1164, 1174 underneath, to provide support for the outer enclosure members 1161, 1171 for transport and during the time when the outer enclosure members 1161, 1171 are in an open or retracted position, as shown in FIG. 11.

Figure 12A:
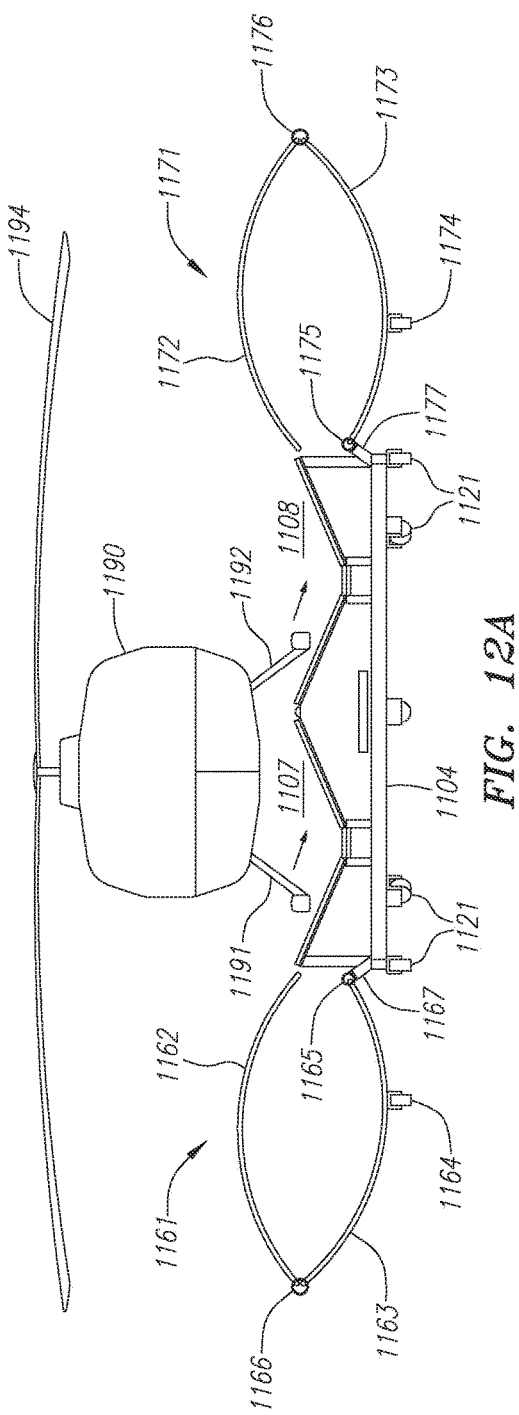
FIGS. 12A and 12B are front view diagrams illustrating operation of the helicopter landing pad of FIG. 11 in connection with a helicopter landing.
Figure 12B:
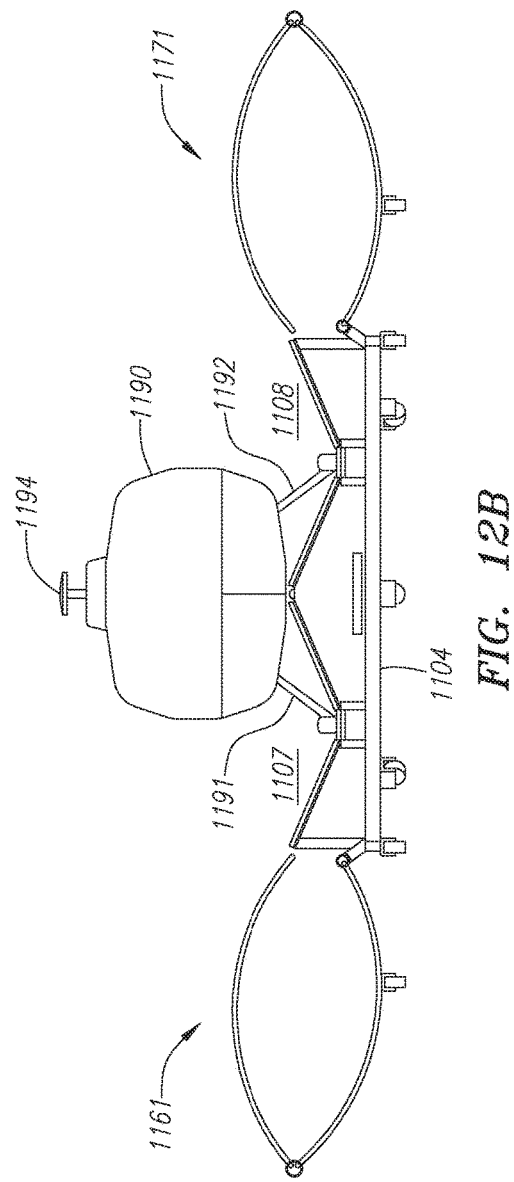
Figure 13A:
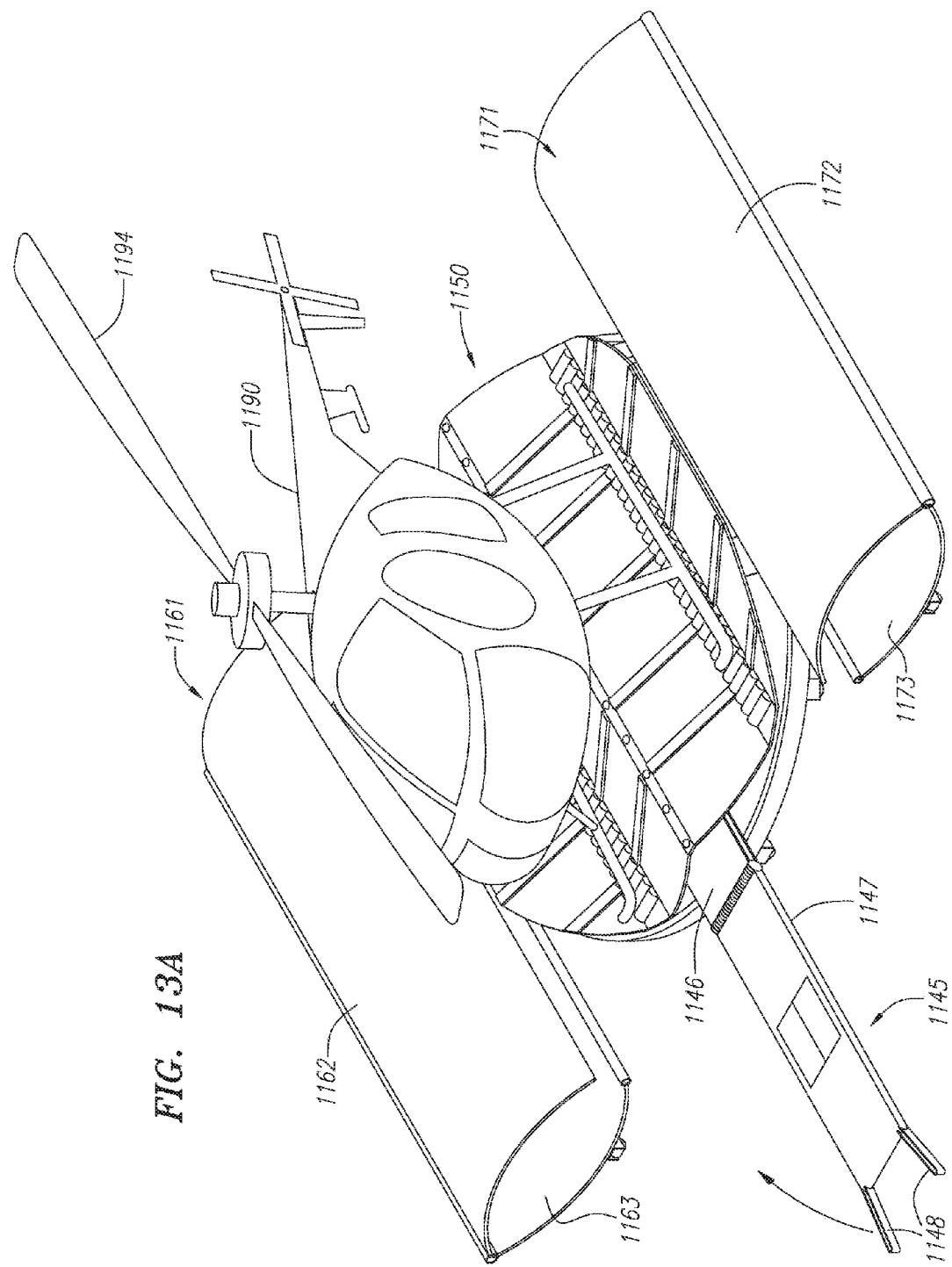
FIG. 13A is an oblique view diagram illustrating a helicopter after landing on the helicopter landing pad of FIG. 11.
Figure 13B:
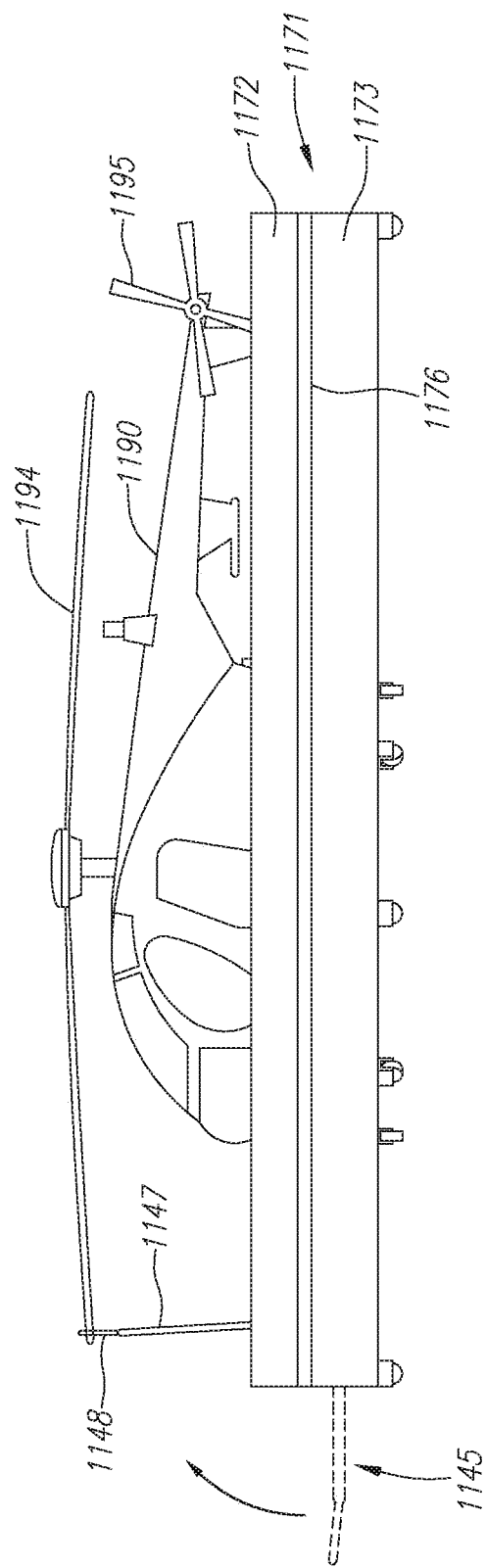
FIG. 13B is a side view diagram similar to FIG. 13A but showing the blade locking arm moved into a locking position.

In general, the outer enclosure members 1161, 1171 may be open or retracted when a helicopter lands on the helipad 1100, and then may be closed to form an outer protective chamber for the helicopter. The operation of the helipad 1100 of FIG. 11 may be explained by reference to the additional FIGS. 12A-12B, 13A-13B and 14A-14B. FIGS. 12A and 12B are front view diagrams of the helipad 1100 illustrating landing of a helicopter 1190 on the helipad 1100. As shown in FIG. 12A, the struts or skates 1191, 1192 of the helicopter 1190 are shown about to touch down in guiding channels 1107, 1108. Upon touchdown, the weight of the helicopter 1190 causes it to gently slide into the center of the channels 1107, 1108, as shown in FIG. 12B. FIG. 13B shows the helicopter 1190 at landing from another angle. After landing, the upper blade or rotor 1194 of the helicopter 1190 is maneuvered into a position along the central axis of the helicopter 1190, in a manner previously described (e.g., by action of the pilot, or by rotating the small tail blade of the helicopter). Once the upper blade 1194 is in alignment, the multi-function extension member 1145 may be swung upwards so that the blade clamp 1148 portion thereof locks the upper blade 1194 into a straight position, as shown in FIG. 13B.

Figure 14A:
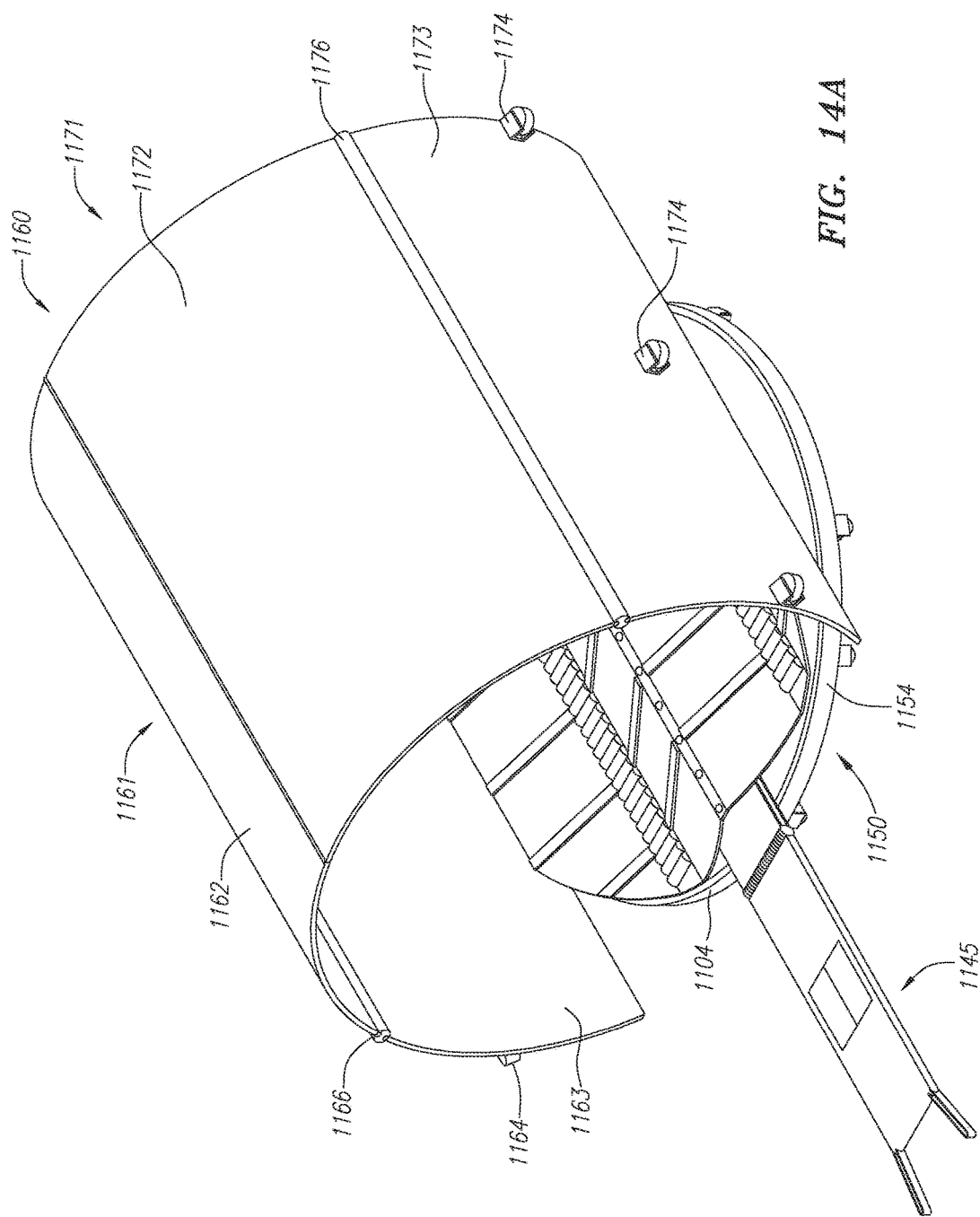

Next, the retractable shell is closed in order to protect the helicopter 1190 and ready it for transport and/or storage. The folded outer enclosure members 1161, 1162 are lifted into an extended position, such that the two panels 1162, 1163 of the first outer enclosure member 1161 form a half-cylindrical shell, and the two panels 1172, 1173 of the other outer enclosure member 1171 form a complementary half-cylindrical shell, both of which meet along the center axis of the helipad 1100 to form a complete enclosure 1160 resembling a partial tube for the helicopter 1190 having a generally dome-shaped cross-section, as shown in FIGS. 14A (oblique view without the helicopter) and 14B (front view with the helicopter in position). Hinged connectors 1166, 1176 may facilitate the unfolding of the outer enclosure members 1161, 1171. As the outer enclosure members 1161, 1171 are unfolded, the wheels 1164, 1174 are raised up off the ground, and are no longer needed for supporting the outer enclosure members 1161, 1171.

Figures 15A, 15B:
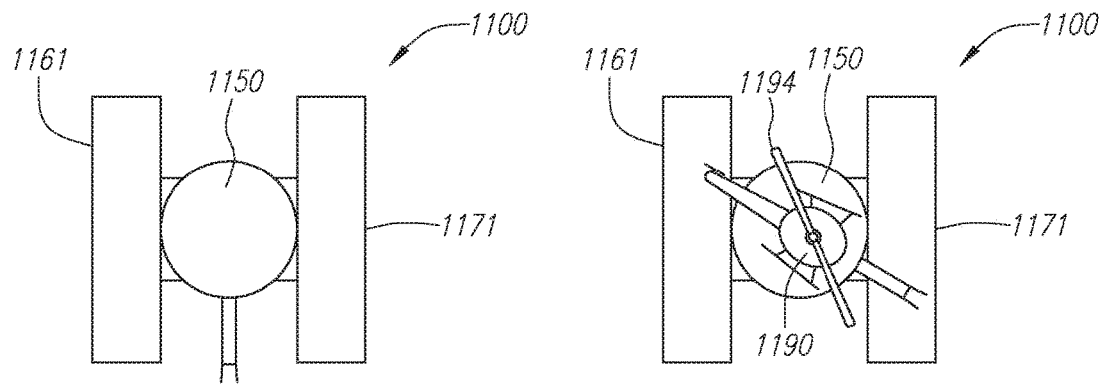
FIGS. 15A through 15D are top view diagrams illustrating operation of a rotating helicopter landing pad having a collapsible shell.
Figures 15C, 15D:
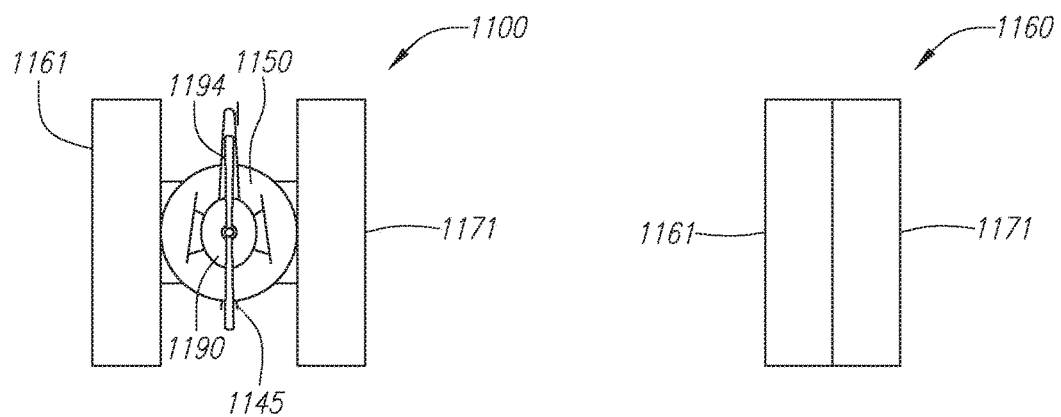

While FIG. 12A shows a helicopter 1190 landing in the same direction as the central axis of the helipad 1100, the helicopter 1190 may also land at an angle relative to the central axis. FIGS. 15A-15D illustrate the situation where, assuming the upper platform of the helipad 1100 is rotatable, the helicopter lands at such an angle. FIG. 15A shows an idealized top view of the helipad 1100 of FIG. 11, with the platform 1150 shown from the top, and outer enclosure members 1161, 1171 depicted to either side of the rotatable platform 1150. As the helicopter approaches, the rotatable platform may rotate, or be rotated, so that it becomes oriented with the trajectory of the helicopter 1190 and/or the prevailing wind direction, as shown in FIG. 15B (although the multi-function extension member 1145 is shown extended in FIG. 15B, in operation it may actually be stowed beneath the helipad 1100 during this maneuvering, or else it may be positioned high enough to clear the outer enclosure members 1161, 1171 when the unit is rotated). The helicopter 1190 may thus land at an angle on the rotatable platform 1150, as shown in FIG. 15B. Then, after the helicopter 1190 has landed, the platform 1150 may be rotated back to its normal alignment with the center axis of the helipad 1100, in the same direction as the outer enclosure members 1161, 1171, as shown in FIG. 15C. Then, the blade lock (or multi-function extension member) 1145 may be maneuvered into position after the blade 1194 is properly aligned with the center axis of the helipad 1100, and the outer enclosure members 1161, 1171 may be folded into an enclosed outer shell 1160, as previously described in relation to FIGS. 14A-14B, and as shown in the top view of FIG. 15D.

An outer shell or enclosure (such as 1160 previously described) may be useful in protecting the helicopter, which is an expensive asset, after it lands. Rental of storage space in airport hangars can be expensive, yet nonetheless it is generally necessary to store a helicopter after landing because of the craft's fragility. A helicopter may be vulnerable to the elements, and this may be especially true at sea, where the helicopter may suffer from corrosion if left exposed for long periods. A helipad such as illustrated in FIG. 11, with its foldable shell enclosure, may be readily adapted for use at sea. While the helipads described herein are generic to any kind of helicopter, the helipad 1100 of FIG. 11 may be especially well suited for the two-bladed variety of helicopter, because it is narrower in profile when the blades are centrally aligned.

The collapsible shell 1160 forming the protective helicopter housing is preferably rigid, and, for example, may be made of ribbed fiberglass, foldable aluminum or other metallic plates, or any other suitable material. While the collapsible shell 1160 is preferably constructed as two-piece structure with left and right folding housing members, it can also take other forms as well, and may be constructed with accordion-like unfolding members, or else take other shapes besides the tube-shape shown in FIG. 11. While the size may vary, the collapsible shell is preferably long enough to encapsulate the entire helicopter 1190 including the blade.

Figure 17:
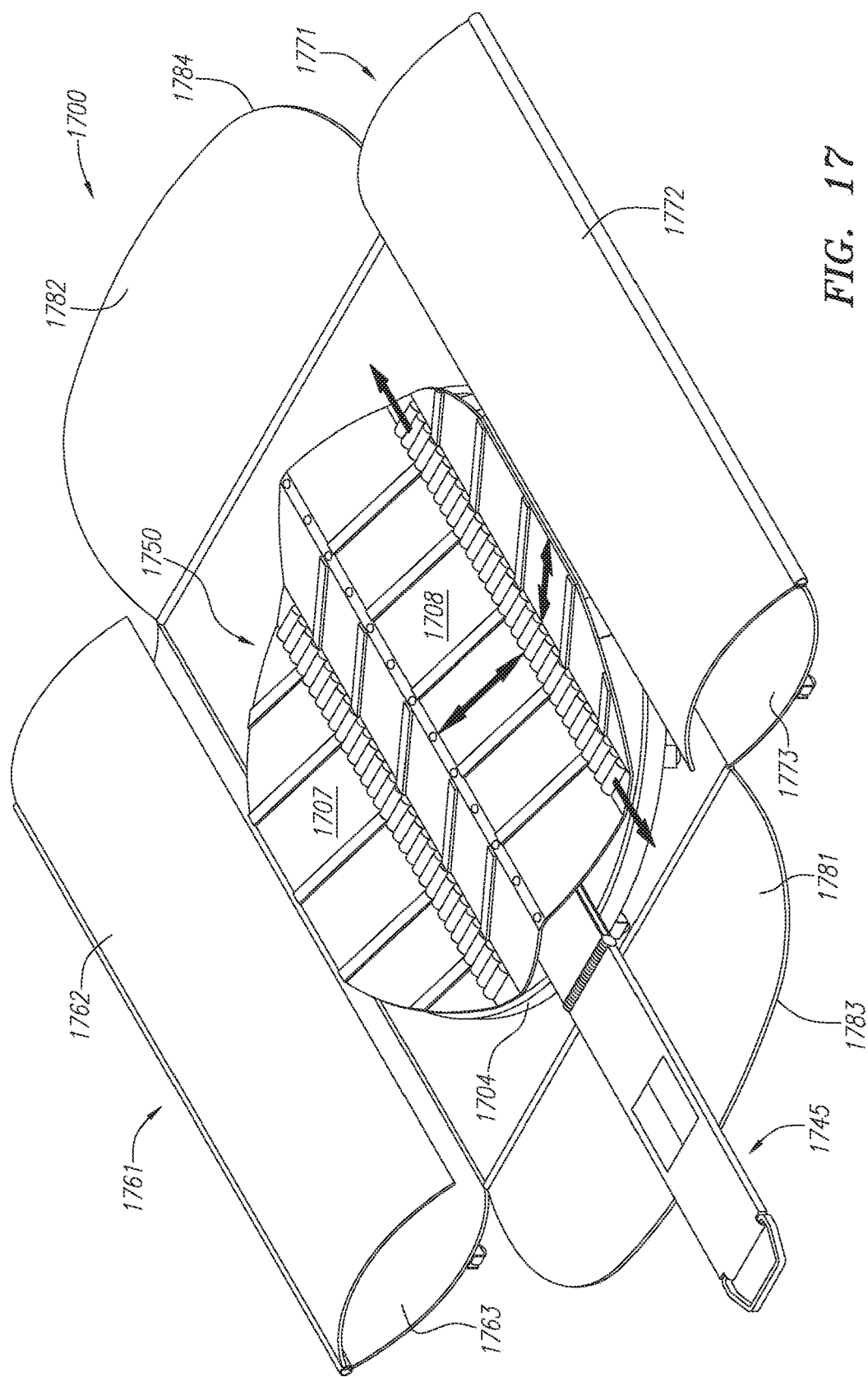
FIG. 17 is an oblique view diagram of a helicopter landing pad with collapsible shell similar to FIG. 11, but with the addition of front and rear doors for the collapsible container shell.

FIG. 17 illustrates another embodiment of a helicopter landing pad or helipad 1700 with collapsible shell similar to FIG. 11, but with the addition of front and rear doors 1781, 1782 forming a completely enclosed collapsible container shell. In FIG. 17, elements denoted 17*xx* are generally similar to the corresponding counterparts labeled 11*xx* in FIG. 11. In FIG. 17, the front door 1781 and rear door 1782 each may be connected to a transverse frame member spanned between the ends of outer enclosure members 1761, 1771, such that the front and rear doors 1781, 1782 can swing upward and downward. The transverse frame members may take the form of a rod, and the front and rear doors 1781, 1782 may have a hollow cylindrical base enclosing the rod in the manner of a hinge in order to allow free swinging motion of the front and rear doors 1781, 1782. The front and rear doors 1781, 1782 may have locks or latches that secure them when they are in a raised position. The front and rear doors 1781, 1782 may also have wheels (not shown) underneath them, similar to the wheels under outer enclosure members 1761, 1771, to facilitate towing and transport. The front and rear doors 1781, 1782 may be made of similar material(s) as the outer enclosure members 1761, 1771.

Figure 18A:
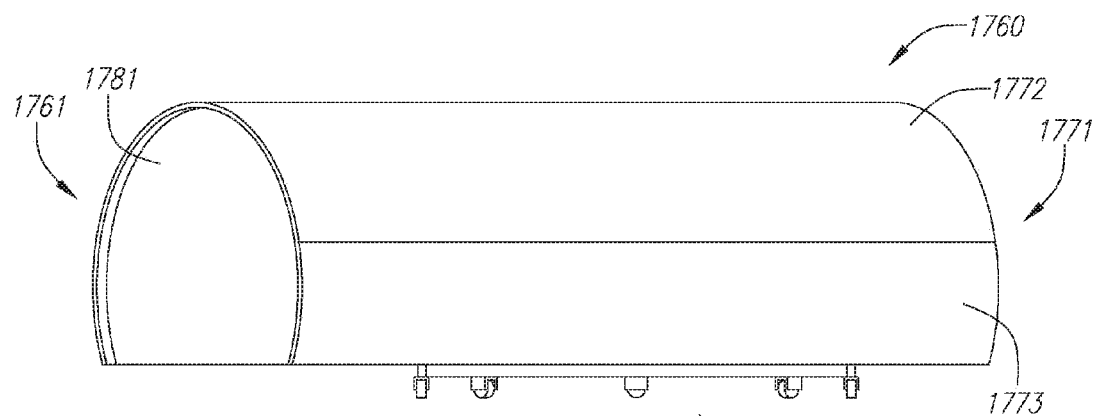
FIGS. 18A and 18B are oblique and front view diagrams, respectively, illustrating the collapsible shell of the helicopter landing pad in FIG. 17 in a closed position, after deployment.
Figure 18B:

The front and rear doors 1781, 1782 may each have a flexible rubber lip (1783 and 1784 respectively) along the periphery or edge of the front and rear doors 1781, 1782, so that when the doors are in a raised position the enclosed chamber is reasonably well sealed from the elements, providing further protection for the helicopter within the enclosed chamber. In a preferred embodiment, the front and rear doors 1781, 1782 are constructed so that when they are raised, they fit snugly beneath the outer edge of the half-cylindrical dome which comprises the outer shell housing 1760 formed by the unfolded and fully deployed outer enclosure members 1761, 1771, as illustrated in FIGS. 18A

(oblique view) and 18B (top view), for example. By being recessed, the front and rear doors 1781, 1782 improve the integrity of the enclosure of the outer shell housing 1760. The flexible rubber lips 1783, 1784 may be contoured outward, so that as they are raised underneath the outer shell housing 1760 they slide smoothly underneath, and press up against, the bottom ceiling surface thereof.

The multi-function extension member 1745 illustrated in FIG. 17 has a blade lock tip forming an enclosed loop, as opposed to a fork-shaped blade clamp member 548 shown in FIG. 5 or 1148 shown in FIG. 11, although it alternatively may be forked shape as in FIG. 5 or 11.

Figure 19:
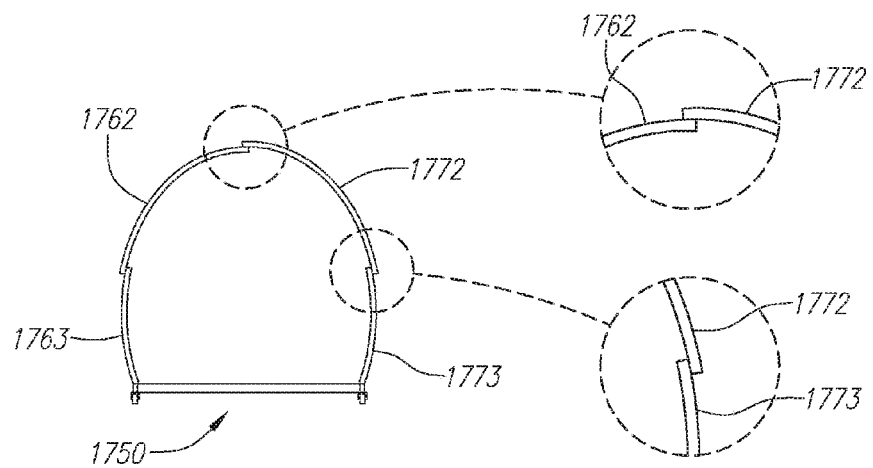
FIG. 19 is a front view diagram of a particular embodiment or variation of the helicopter landing pad with collapsible shell as in FIG. 17, showing particular details of the collapsible shell panels.

In some embodiments, the various panel members of the outer shell housing 1760 may overlap to further improve the resistance of the enclosure to the outside elements. FIG. 19 illustrates one embodiment or variation of the helipad 1700 with collapsible shell shown in FIG. 17, depicting particular details of the collapsible shell panels. As shown in FIG. 19, when the outer enclosure member 1771 is fully deployed, the top panel 1772 of the outer enclosure member 1771 slightly overlaps the bottom panel 1773 of the outer enclosure member 1771, improving the integrity of the enclosed chamber. Likewise, when the other outer enclosure member 1761 is fully deployed, the top panel 1762 of the outer enclosure member 1761 slightly overlaps the bottom panel 1763 of the outer enclosure member 1761. This effect can be easily achieved by locating hinges for the folding outer enclosure member 1771 along the top edge of the bottom panel 1773, and underneath and slightly indented with respect to the inner surface of the top panel 1772, with a similar configuration for the other outer enclosure member 1761. Then, as the outer enclosure member 1771 is deployed, the edge of the top panel 1772 will fold on top of the outer top edge of the bottom panel 1763, as shown in the exploded view of these details within FIG. 19.

Similarly, outer enclosure member 1771 may overlap slightly with the other outer enclosure member 1761 when they are fully deployed, as further shown in FIG. 19, to improve the integrity of the seal of the enclosed chamber—for example, to help prevent rain from entering the chamber via the thin crack between the closed outer enclosure members 1761, 1771. A rubber seal or lip may also be provided along the top edge of either or both of outer enclosure member 1761, 1771, to further improve resistance to the elements.

With a rotatable helipad as illustrated in various embodiments herein, a helicopter can land in any direction; then be turned on the helipad platform to orient it along the center axis of the helipad, i.e., in line with the enclosure panels (if provided). The enclosure panels may then be deployed to safely stow and shield the helicopter, and provider a useful container for towing, transport and storage.

It may be useful, in certain embodiments, for the helipad platform to be higher than the outer enclosure members (when collapsed) 1161, 1171 or 1761, 1771, so as to provide adequate clearance over the enclosure members. Not only can the helipad platform be motorized to facilitate rotation, but also the outer enclosure members 1161, 1171 or 1761, 1771 can be motorized or motor-assisted, with hydraulics or otherwise, to facilitate raising or lowering of the panel members and thus deployment of the outer shell canopy 1160 or 1760. The helipad can also have hydraulics, springs or other mechanical means to assist with assembly and/or disassembly of the shell enclosure.

In some embodiments, a shell-like enclosure can be formed from a set of relatively flat folding plates or panels, which can be folded down and slid beneath the landing platform when not in use. In such a case, the shell may not be tubular, but might be octagon-shaped or polygon-shaped for example, depending on how many folding panels are used.

In one aspect, the provision of a foldable or collapsible enclosure creates the possibility for a "mobile airport", that is, a mobile helipad with a hangar-like container. Helicopters are generally not permitted under FAA regulations to land simply anywhere, and may not be permitted to land, for example, in locations that do not have suitable landing facilities. However, the mobile helipad can provide not only a suitable landing area, but also one that provides safety features (such as wind direction and wind speed indications) that are at least as safe as typical airports, if not more so. A helipad including such an enclosure, as provided by various embodiments herein, may also be towable, with or without the helicopter, allowing the "mobile airport" to be readily moved and relocated. An airport may rent out motile helipads to helicopter owners, who can tow them to various locations to provide temporary helipads virtually anywhere.

Figure 16:
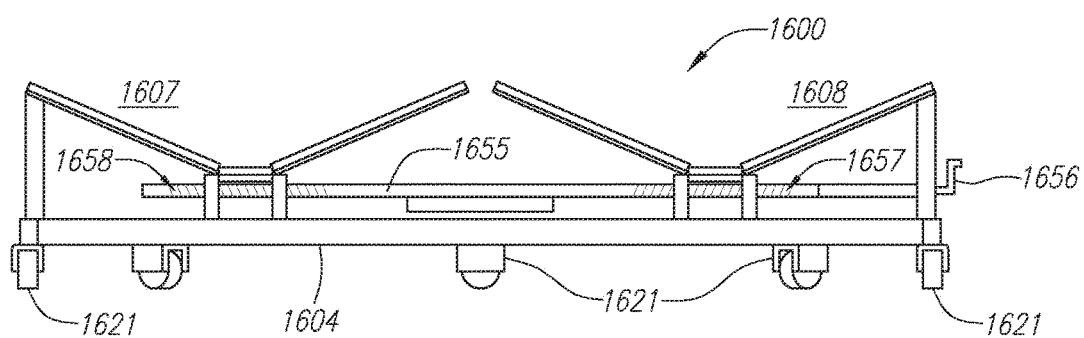
FIG. 16 is a front view diagram of a helicopter landing pad, showing selected details of a mechanism for adjusting the relative width of the guiding channels.

According to other embodiments, the shape, configuration or operation of the guiding channels may be varied. FIG. 16 is an example of one embodiment of a helicopter landing pad or helipad 1600 having adjustable guiding channels 1607, 1608. In FIG. 16, the helipad 1600 has a platform base 1604, similar to those previously described with respect to other embodiments, supported by a set of wheels 1621 which may be fixed position or else may rotate similar to caster wheels. A pair of wedge-shaped guiding channels 1607, 1608, seen from front view, are provided to facilitate landing of a helicopter in a manner previously described. In this embodiment, the guiding channels 1607, 1608 are not fixed in place, but rather can be moved separately although in tandem. A crankscrew 1655 with an elongate shaft extends through a wedge base located beneath each of the guiding channels 1607, 1608. The crankscrew 1655 has positive threadings 1658 for one of the wedge bases, and negative threadings 1657 for the other. When the crankscrew 1655 is rotated, the guiding channels 1607, 1608 move in opposite directions. To make the width of the helipad landing area narrower, the guiding channels 1607, 1608 are moved towards one another, and to make the width wider the crankscrew 1655 is rotated the opposite direction so that the guiding channels 1607, 1608 are moved away from each other.

In this particular example, the crankscrew 1655 is rotatable via a crank handle 1656, although alternatively the crankscrew 1655 may be motorized or motor-assisted. The crankscrew 1655, as noted, has opposite threadings 1658, 1657 passing through the base of each of the guiding channels 1607, 1608, while the base of each of the guiding channels 1607, 1608 has complementary threadings, so that when the crankscrew 1655 is turned, the guiding channels 1607, 1608 both slide outward simultaneously or both slide inward simultaneously. This operation keeps the location of the center axis between the guiding channels 1607, 1608 constant, while allowing for adjustment of the relative width between the guiding channels. Keeping the center axis properly aligned is particularly useful where it is desired to center the helicopter within a collapsible housing or shell for enclosure; therefore, the wedge-based guiding channels help the helicopter achieve optimal alignment with respect to the enclosure. Also, in this example, the connection between the guiding channel edges and the support bar of the base platform 1604 may be hinged or flexible, so that as guiding channels 1607, 1608 move left or right, the support bar can tilt accordingly or otherwise follow the motion of the guiding channels 1607, 1608.

While FIG. 16 illustrates an example with both guiding channels 1607, 1608 being laterally adjustable, in simpler versions it is also possible to adjust only a single guiding channel.

It is also possible, in connection with any of the various embodiments disclosed herein, to provide only a single guiding channel instead of two guiding channels. In such a case, only one helicopter strut would align the craft, utilizing the single guiding channel. It is also possible to have more than two parallel guiding channels, possibly making them smaller in width, to provide an alternative landing guidance mechanism.

In any of the various embodiments described herein, landing lights may be placed down the center of the landing pad, between the two guiding channels, to make the direction of landing more visible. This feature can be particularly useful for landings at night or in difficult weather. The landing lights may be programmed (e.g., through an onboard controller or processor) or otherwise configured to flash regularly or periodically, to make them more noticeable.

In one or more embodiments, a novel and versatile helicopter landing pad is provided which may facilitate landing of the helicopter, making landing easier and safer. The helicopter landing pad may allow the helicopter to self-align during or after landing, by way of, e.g., one or more channels for aligning the struts of the helicopter landing gear along a specific axis. The channels may have a set of rollers along each channel wall to allow the weight of the helicopter to self-align the craft's direction along the centerline of the channels as it touches down, and additional rollers down the center axis of the channels may allow the helicopter to be readily moved forward or backward to further adjust its position on the landing pad platform. In various embodiments, the platform may be outfitted a blade locking arm or member to keep the blade secured when the helicopter is parked, and further may include wheels allowing it to be towed as a unit, with the helicopter in place, to a storage facility.

In other embodiments, the helicopter landing pad includes an integrated collapsible enclosure (e.g., shell) for covering and protecting the helicopter after landing. The enclosure may be rigid in nature, and may be rapidly raised up to form a tube-like housing for containing the craft. Fold-down front and rear doors may be provided at either end of the tube-like housing so that the housing fully contains and protects the helicopter from the elements. A collapsible enclosure according to the teachings herein may be particularly advantageous when deployed aboard ships at sea, as the enclosure can provide substantial protection from corrosion.

A portable helicopter landing pad in accordance with various embodiments as disclosed herein may allow a helicopter to land virtually anywhere, regardless of whether an airport or a permanent helipad is available, and to do so safely and with all the information (e.g., wind speed and direction) that would be available at a typical airport. Embodiments having a collapsible enclosure may further allow the helicopter to be sheltered similar to having an available airport hangar. Such a landing pad greatly increases the locations at which a helicopter may be landed and stowed, and can also allow the helicopter owner to avoid paying hangar rental fees that are typical at airports and similar locations.

A rotatable helicopter landing pad in accordance with various embodiments may find particularly advantageous use on watercraft, potentially alleviating the need for a ship or boat to turn into the wind for helicopter landings. This can be very helpful for large ships like aircraft carriers, which are ponderous and may require significant time to turn. It may also be very useful for emergency watercraft like coast guard vessels on which helicopters are deployed. A rotatable helicopter landing pad may also be useful on fishing boats and other small vessels which utilize helicopters.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A helicopter landing pad, comprising:
   a platform;
   a collapsible housing shell attached to said platform, said collapsible housing shell comprising right and left outer enclosure members, each of said right and left enclosure members comprising a plurality of folding panels,
      wherein the right and left outer enclosure members are configured to unfold from a flattened position to a deployed position to form an enclosure surrounding the helicopter after landing; and
      wherein, in the deployed position, a top panel of each of the right and left outer enclosure members overlaps a bottom panel of each respective outer enclosure member.

2. The helicopter landing pad of claim 1, wherein said collapsible housing shell has a dome-shaped cross section.

3. The helicopter landing pad of claim 1, wherein said collapsible housing shell further comprises a front door and a rear door coupled to said platform, said front door and said rear door movable from an open position to a closed position covering front and rear openings respectively of the folding housing shell.

4. The helicopter landing pad of claim 1, wherein at least two of the plurality of folding panels from each of the right and left enclosure members are hingedly connected.

5. The helicopter landing pad of claim 1, wherein each of the right and left outer enclosure members form complementary half-cylindrical shells in the deployed position.

6. The helicopter landing pad of claim 1, wherein the top panel of each of the right and left outer enclosure members is hingedly connected to the bottom panel of each respective outer enclosure member by a hinge located along the top edge of the bottom panel and underneath and indented with respect to the inner surface of the top panel.

7. The helicopter landing pad of claim 1, wherein the right and left outer enclosure members overlap each other in the deployed position.

8. The helicopter landing pad of claim 3, wherein each of the front door and the rear door are configured with a flexible rubber lip along a periphery edge.

9. The helicopter landing pad of claim 3, wherein each of the front door and the rear door are configured to latch to the right and left outer enclosure members in the closed position.

10. A helicopter landing pad, comprising:
    a platform;
    a collapsible housing shell attached to said platform, said collapsible housing shell comprising right and left outer enclosure members, each of said right and left enclosure members comprising a plurality of folding panels,
       wherein the right and left outer enclosure members overlap each other in the deployed position.

11. The helicopter landing pad of claim 10, wherein said collapsible housing shell has a dome-shaped cross section.

12. The helicopter landing pad of claim 10, wherein said collapsible housing shell further comprises a front door and a rear door coupled to said platform, said front door and said rear door movable from an open position to a closed position covering front and rear openings respectively of the folding housing shell.

13. The helicopter landing pad of claim 10, wherein at least two of the plurality of folding panels from each of the right and left enclosure members are hingedly connected.

14. The helicopter landing pad of claim 10, wherein the top panel of each of the right and left outer enclosure members is hingedly connected to the bottom panel of each respective outer enclosure member by a hinge located along the top edge of the bottom panel and underneath and indented with respect to the inner surface of the top panel.

15. The helicopter landing pad of claim 10, wherein each of the front door and the rear door are configured with a flexible rubber lip along a periphery edge.

16. The helicopter landing pad of claim 10, wherein each of the front door and the rear door are configured to latch to the right and left outer enclosure members in the closed position.

* * * * *